United States Patent
Headlee

(10) Patent No.: US 10,858,050 B2
(45) Date of Patent: Dec. 8, 2020

(54) SWING AWAY SUPPORT ASSEMBLY FOR SPARE TIRE CARRIER

(71) Applicant: Lund Motion Products, Inc., Buford, GA (US)

(72) Inventor: Jake Headlee, Anaheim, CA (US)

(73) Assignee: Lund Motion Products, Inc., Ann Arbor, MI (US)

( * ) Notice: Subject to any disclaimer, the term of this patent is extended or adjusted under 35 U.S.C. 154(b) by 2 days.

(21) Appl. No.: 16/395,000

(22) Filed: Apr. 25, 2019

(65) Prior Publication Data

US 2019/0351955 A1 Nov. 21, 2019

Related U.S. Application Data

(60) Provisional application No. 62/662,635, filed on Apr. 25, 2018.

(51) Int. Cl.
*B62D 43/02* (2006.01)
*B60Q 1/44* (2006.01)
*B60Q 1/26* (2006.01)

(52) U.S. Cl.
CPC ............ *B62D 43/02* (2013.01); *B60Q 1/2661* (2013.01); *B60Q 1/44* (2013.01)

(58) Field of Classification Search
CPC .......... B62D 43/00; B62D 43/02; B60Q 1/44; B60Q 1/2661
USPC ...................................................... 224/42.21
See application file for complete search history.

(56) References Cited

U.S. PATENT DOCUMENTS

| | | | |
|---|---|---|---|
| 2,805,807 A | 9/1957 | Slack | |
| 4,140,255 A | 2/1979 | Weiler | |
| 4,561,575 A | 12/1985 | Jones | |
| 4,718,582 A * | 1/1988 | Iovenitti | B62D 43/02 224/42.21 |
| 4,817,834 A * | 4/1989 | Weiler | B62D 43/02 224/42.21 |
| 5,104,015 A | 4/1992 | Johnson | |
| 5,370,285 A | 12/1994 | Steelman | |
| 5,806,736 A * | 9/1998 | Kincart | B62D 43/02 224/42.13 |
| 6,659,318 B2 | 12/2003 | Newbill | |
| 6,796,466 B2 | 9/2004 | Essig | |
| 6,923,351 B2 * | 8/2005 | Roehmer | B60R 11/06 224/42.21 |
| 7,021,685 B2 * | 4/2006 | Newbill | B60R 19/48 224/42.12 |
| 7,861,902 B2 | 1/2011 | Osenkowski | |
| 8,251,265 B2 | 8/2012 | Grudek | |
| 8,540,125 B2 * | 9/2013 | Newbill | B62D 43/02 224/42.21 |

(Continued)

FOREIGN PATENT DOCUMENTS

DE 29 46 449 5/1981

*Primary Examiner* — Justin M Larson
(74) *Attorney, Agent, or Firm* — Knobbe, Martens, Olson & Bear, LLP

(57) ABSTRACT

Disclosed herein are embodiments of a swing away support assembly that can be installed on a tailgate of a vehicle, such as on a bumper and/or rear panel of the vehicle. The swing away support assembly can provide additional structural support for spare tires and/or other heavy mounted objects. Advantageously, the swing away support assembly is compatible with existing spare tire carriers, backup cameras, and rear lights.

23 Claims, 24 Drawing Sheets

(56) References Cited

U.S. PATENT DOCUMENTS

| | | |
|---|---|---|
| 10,370,044 B2 * | 8/2019 | Cherry .................. B62D 43/02 |
| 10,661,845 B2 * | 5/2020 | Wymore ................ B62D 43/02 |
| 2018/0118283 A1 | 5/2018 | Gutierrez |
| 2019/0126840 A1 * | 5/2019 | Grossaint ............. B62D 43/002 |
| 2019/0351955 A1 * | 11/2019 | Headlee ................ B62D 43/02 |

* cited by examiner

SWING AWAY SUPPORT ASSEMBLY FOR SPARE TIRE CARRIER

INCORPORATION BY REFERENCE

Any and all applications for which a foreign or domestic priority claim is identified in the Application Data Sheet as filed with the present application are hereby incorporated by reference under 37 CFR 1.57.

This application claims a priority benefit under at least 35 U.S.C. § 119 to U.S. Patent Application No. 62/662,635, filed Apr. 25, 2018, the entirety of which is hereby incorporated by reference herein.

BACKGROUND

Field

Certain embodiments disclosed herein relate generally to spare tire carriers for use on or adjacent to vehicle tailgates. Embodiments of the disclosure can provide additional support for the weight of a spare tire and/or spare tire carrier, thereby reducing the risk of damage to the tailgate of the vehicle.

Description of the Related Art

Some spare tire carriers are mounted solely to the sheet metal on a vehicle's tailgate. There is a risk that such a spare tire carrier may damage the tailgate when a heavy spare tire is mounted on the spare tire carrier (e.g., damage the sheet metal, damage hinges of the tailgate, etc.). Some aftermarket spare tire carriers require replacement of the vehicle's existing backup camera and/or rear light. One aspect of the disclosure is the recognition that this process can be difficult, expensive, and/or environmentally wasteful.

SUMMARY

Disclosed herein are embodiments of a method of mounting a swing away support assembly on a vehicle, the method comprising connecting the swing away support assembly to the vehicle, wherein the swing away support assembly comprises a pivot, an arm, a main body including a support platform, and a vehicle mount, the swing away support assembly being rotatable about the pivot, removing an existing spare tire carrier assembly from a rear panel of the vehicle, wherein the existing spare tire carrier assembly comprises a tire carrier housing, a camera housing, a rear camera, a rear light mount, and a rear light, and mounting the existing spare tire carrier assembly on the swing away support assembly in a single step.

In some embodiments, removing the existing spare tire carrier assembly from the rear panel of the vehicle comprises removing the existing spare tire carrier assembly as a single unit. In some embodiments, removing the existing spare tire carrier assembly from the rear panel of the vehicle comprises keeping the rear light mount connected to the tire carrier housing.

In some embodiments, mounting the existing spare tire carrier assembly on to the swing away support assembly comprises mounting the existing spare tire carrier assembly on to the support platform as a single unit.

In some embodiments, the method can further comprise extending an electrical wire through a hole in the support platform.

In some embodiments, the method can further comprise removing an existing bumper from the vehicle and installing a bumper having a pivot mount on the vehicle. In some embodiments, connecting the swing away support assembly to the vehicle comprises inserting at least a portion of the pivot of the swing away support assembly into at least a portion of the pivot mount in the bumper, wherein the pivot mount defines an opening in the bumper.

In some embodiments, the method can further comprise creating a hole in an existing bumper for receiving a portion of the pivot of the swing away support assembly.

In some embodiments, the method can further comprise keeping the main body of the swing away support assembly spaced apart from the existing spare tire carrier assembly when connecting the pivot to the vehicle.

In some embodiments, removing the existing spare tire carrier assembly from the rear panel of the vehicle comprises keeping the rear camera connected to an electrical wire of the vehicle. In some embodiments, removing the existing spare tire carrier assembly from the rear panel of the vehicle comprises keeping the rear light connected to an electrical wire of the vehicle.

In some embodiments, removing the existing spare tire carrier assembly from the rear panel of the vehicle comprises separating the rear light mount from the tire carrier housing.

In some embodiments, connecting the swing away support assembly to the vehicle comprises repurposing a plurality of fasteners of the existing tire carrier assembly to secure the vehicle mount to the rear panel of the vehicle.

In some embodiments, the method can further comprise removing a cushion from the rear panel of the vehicle and attaching it to the support platform of the swing away support assembly, the cushion forming a buffer between a tire and the support platform when the tire is attached to the tire carrier housing.

In some embodiments, connecting the swing away support assembly to the vehicle comprises attaching a first end of a link to a first link mount on the vehicle mount and attaching a second end of the link to a second link mount on the support platform such that when the rear panel of the vehicle swings out, the swing away support assembly swings with it and maintains a gap between the vehicle mount and the main body.

Also disclosed herein are embodiments of a swing away support assembly for repositioning an existing spare tire carrier assembly on a vehicle having a bumper, the swing away support assembly comprising a main body comprising a frame and a support platform, a pivot configured to connect to the bumper of the vehicle, an arm extending from the pivot to the main body, a vehicle mount configured to attach to a rear panel of the vehicle, wherein the vehicle mount comprises a first link mount and the support platform comprises a second link mount, and a link having a first end and a second end opposite the first end, wherein the first end of the link is coupled to the first link mount of the vehicle mount and the second end of the link is coupled to the second link mount of the support platform.

In some embodiments, the pivot is stepped, having at least a first section with a first diameter and a second section with a second diameter that is larger than the first diameter, and wherein when the pivot is connected to the vehicle the first section of the pivot is inserted into an opening in the bumper.

In some embodiments, the vehicle mount defines an opening for a vehicle vent panel.

In some embodiments, the support platform comprises a back light mount support for a light mount.

In some embodiments, the support platform defines at least two sets of holes that each correspond with a fastener pattern of the existing spare tire carrier assembly such that in use a position of the existing spare tire carrier assembly can be adjusted relative to the support platform to accommodate different sized tires.

In some embodiments, the support platform comprises a plurality of apertures configured to provide clearance.

In some embodiments, the swing away support assembly further comprises an accessory mount attached to the arm, the accessory mount comprising a support having a plurality of openings.

In some embodiments, each end of the link comprises a rotatable eyelet connector.

DETAILED DESCRIPTION

Disclosed herein are embodiments of a swing away support assembly for a spare tire carrier that can include a backup camera and/or rear light, which has advantages over previously used spare tire carrier assemblies. The swing away support assembly can advantageously help support heavy tires and other objects that might otherwise have been mounted directly to the sheet metal of the vehicle, thereby reducing the risk of damage to the tailgate of the vehicle. The swing away support assembly can also reposition and reuse existing components, such as an existing spare tire carrier assembly with a tire carrier housing, backup camera, and rear light. Repositioning these components not only helps support heavy loads, but also creates additional clearance for larger objects (e.g., larger tires) to be mounted to the vehicle. Reusing existing electronics advantageously avoids creating more waste, is better for the environment than replacing such components, is less expensive, and is an easier, less time-consuming process.

Figure 1:
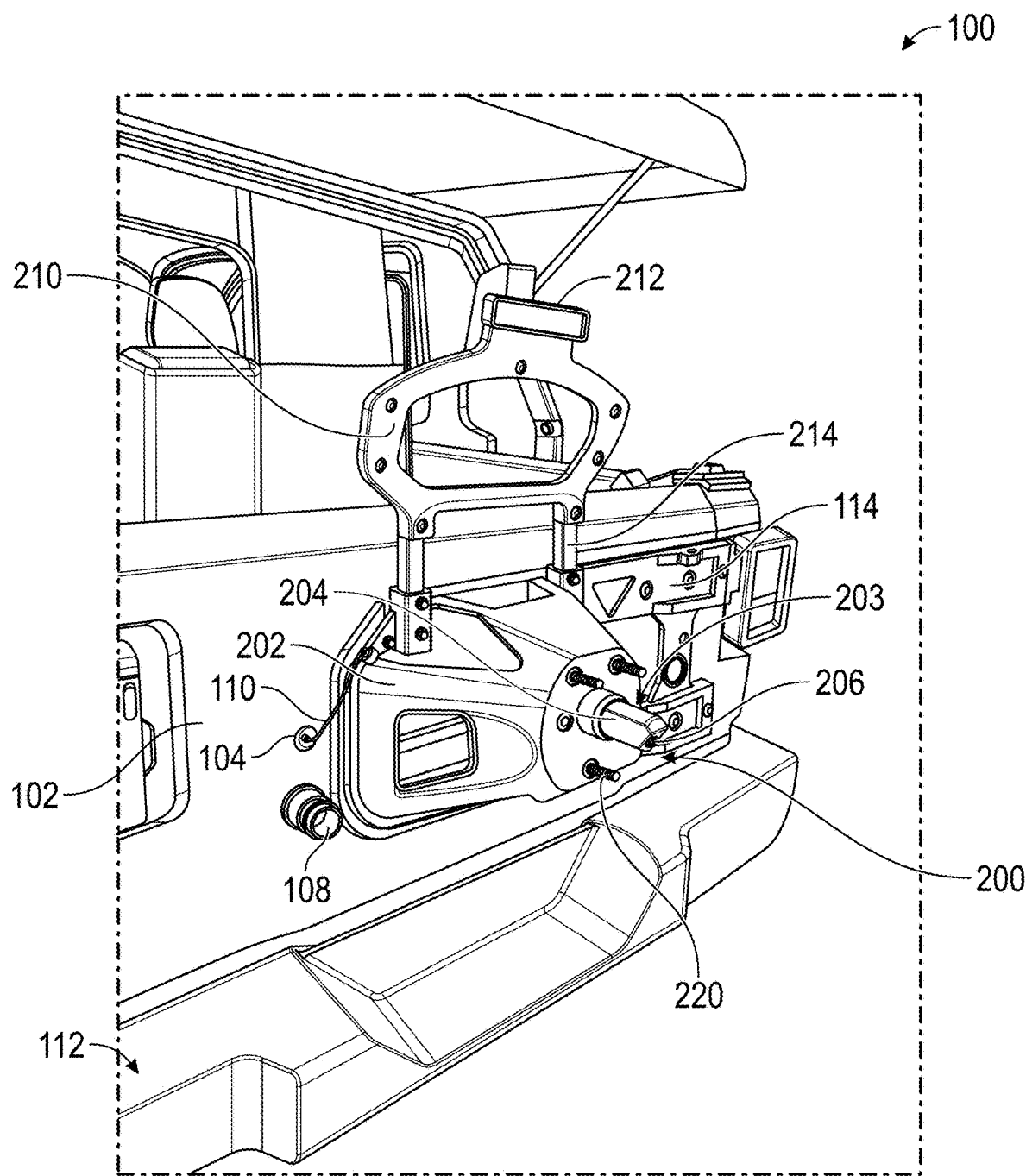
FIG. 1 illustrates an existing spare tire carrier assembly and a hinge reinforcement mounted on a vehicle.
Figure 2:
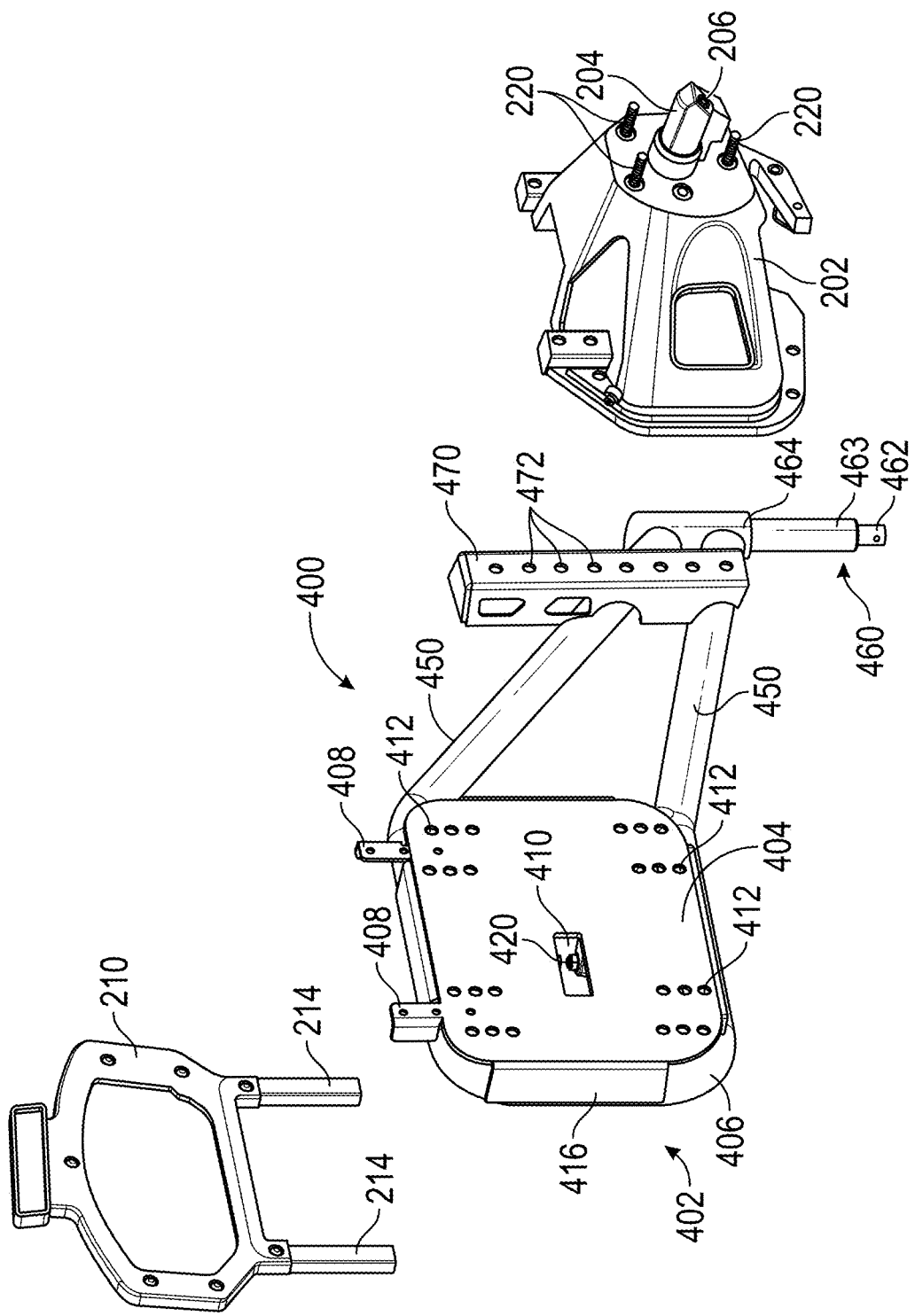
FIGS. 2-6 illustrate different views of an embodiment of a swing away support assembly as disclosed herein.
Figure 10:
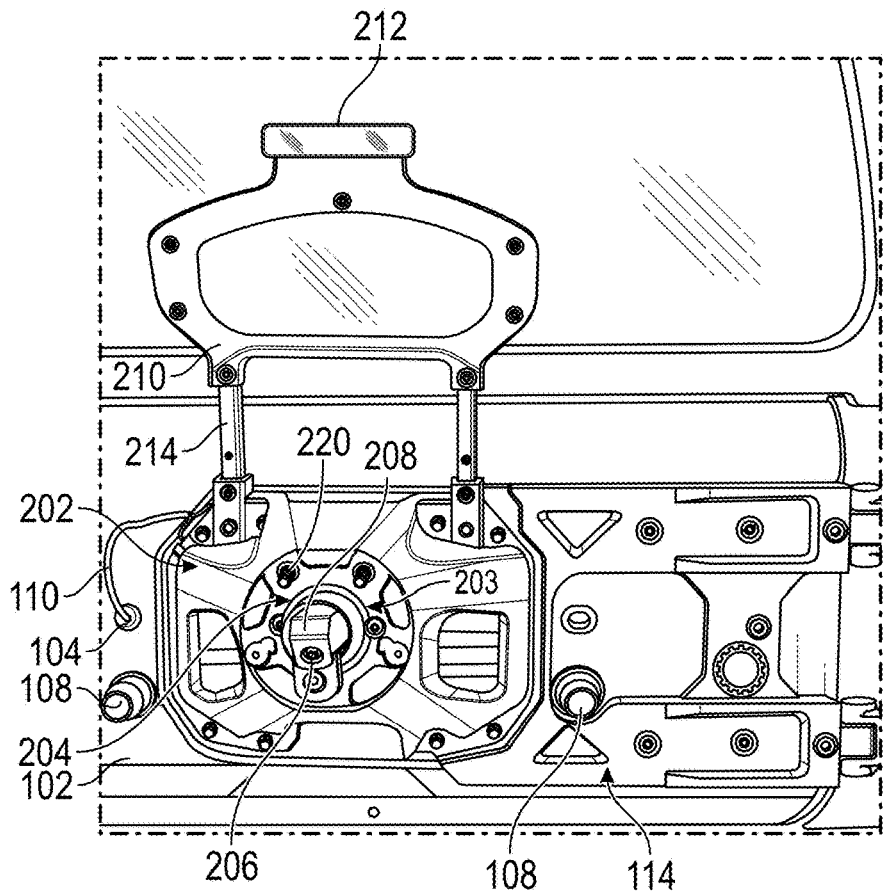
FIG. 10 illustrates the existing spare tire carrier assembly and the hinge reinforcement mounted on a vehicle.
Figure 11:
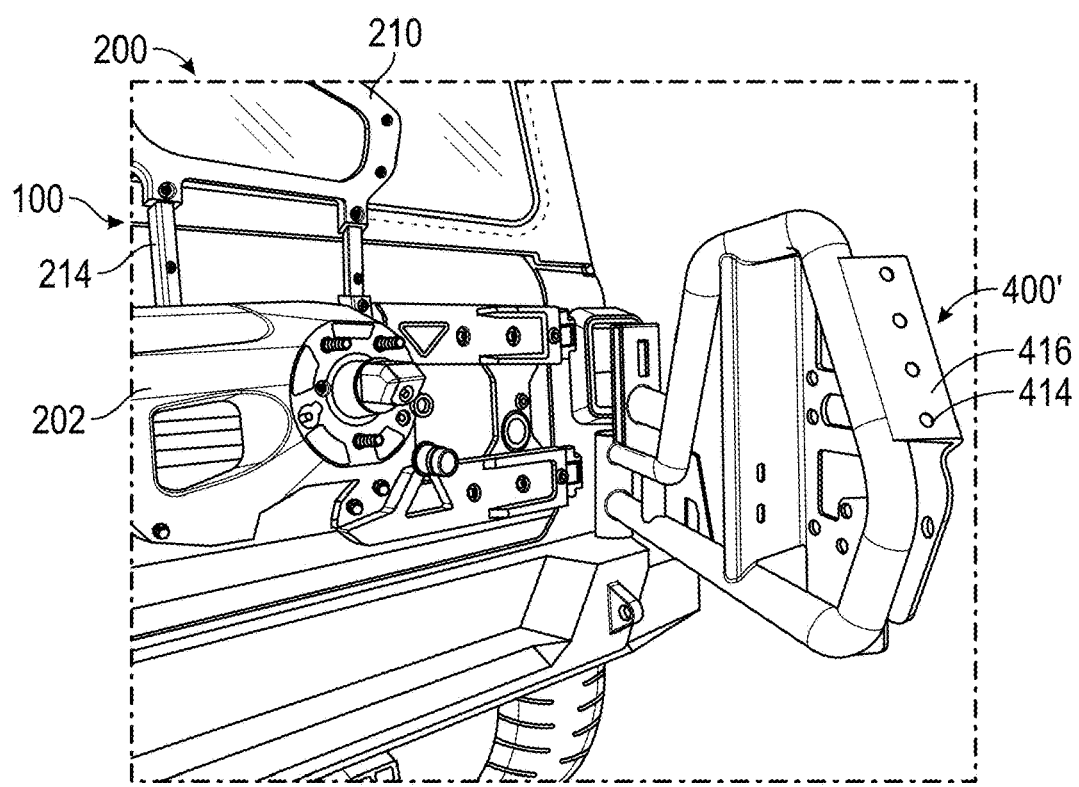
FIG. 11 illustrates an embodiment of a swing away support assembly and the existing spare tire carrier assembly of FIG. 10 mounted on the vehicle.
Figure 12:
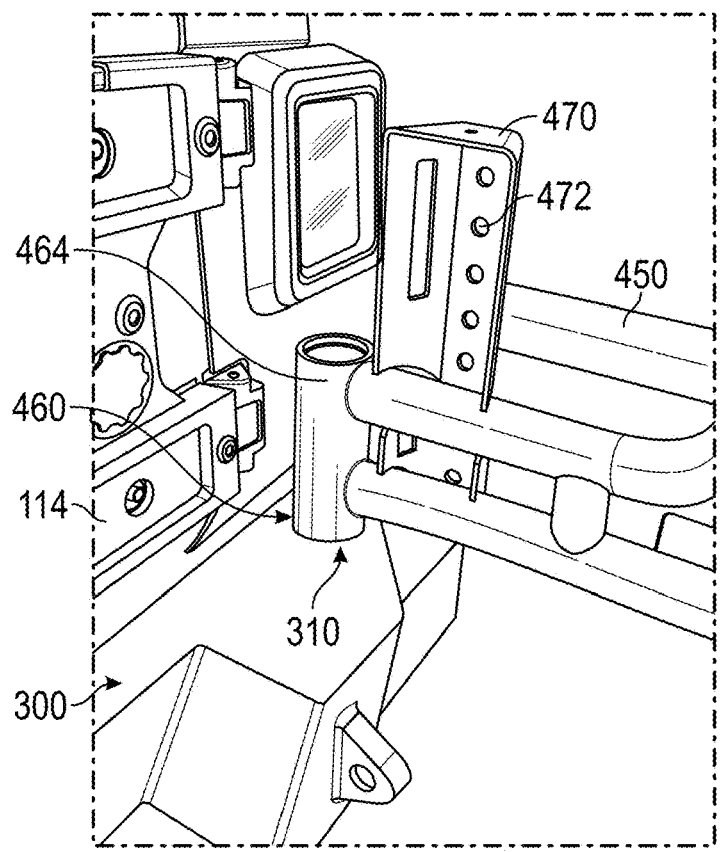
FIG. 12 is a detailed view of a pivot of the swing away support assembly attached to a pivot mount of a bumper.
Figure 13:
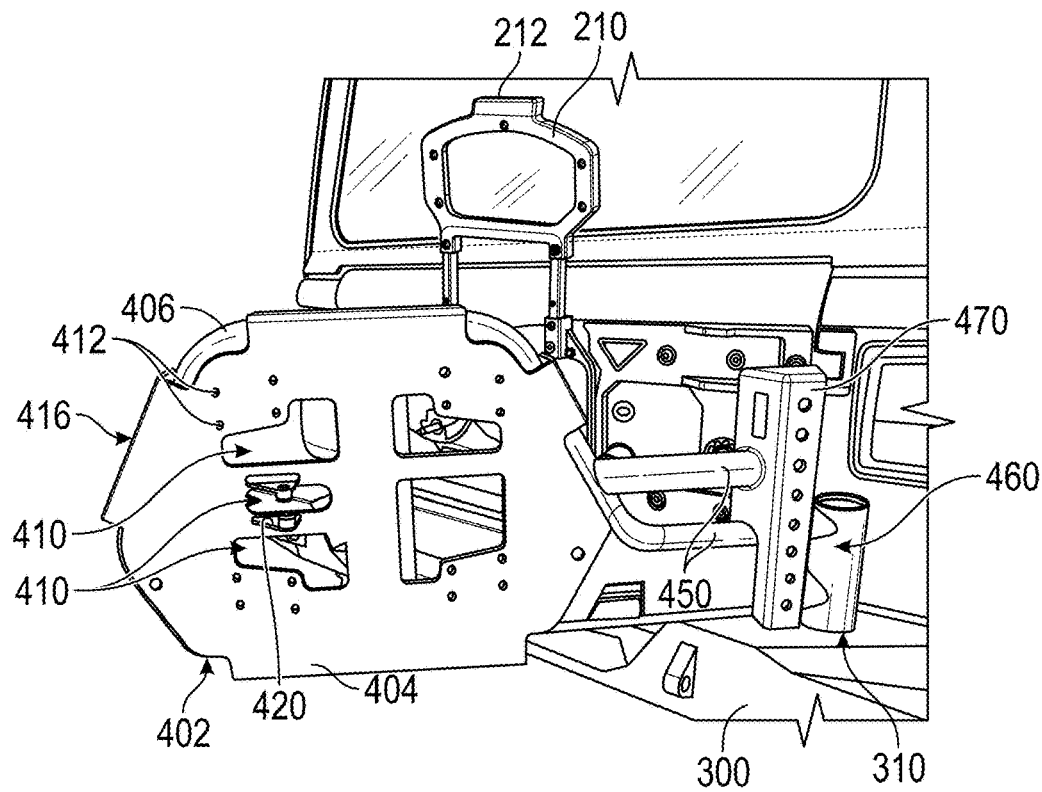
FIGS. 13-15 are different views of the swing away support assembly of FIG. 11.
Figure 14:
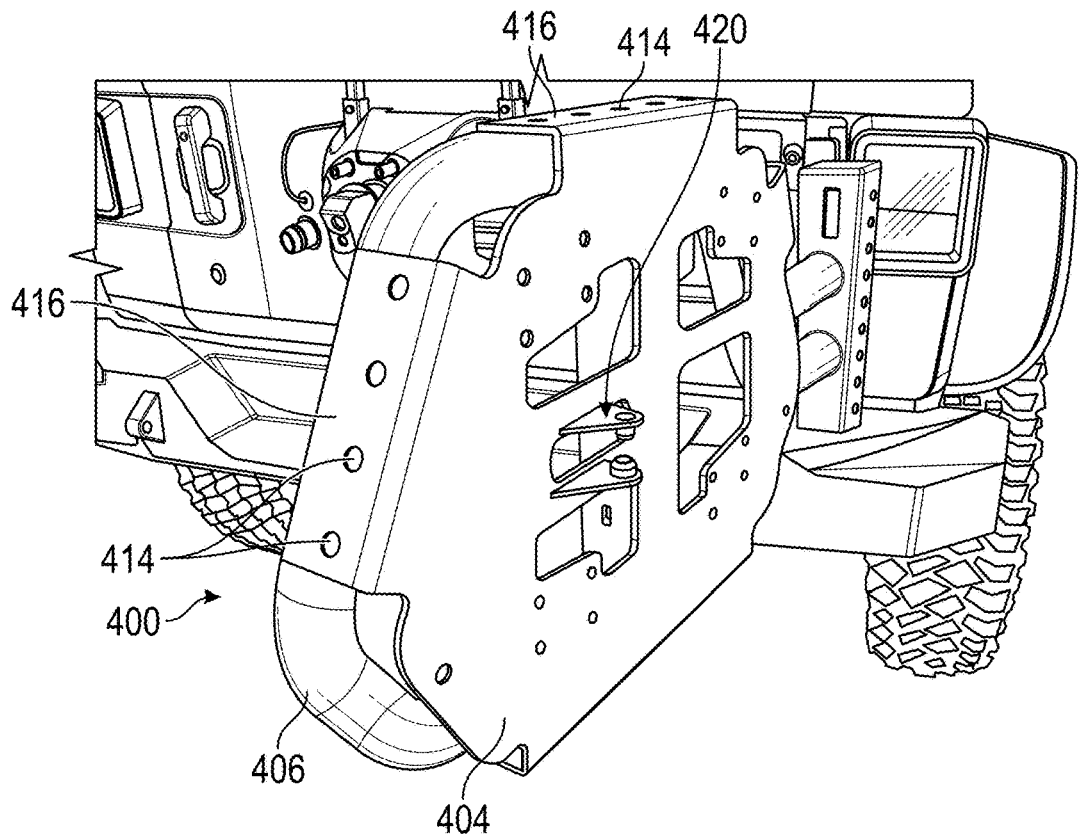
Figure 15:
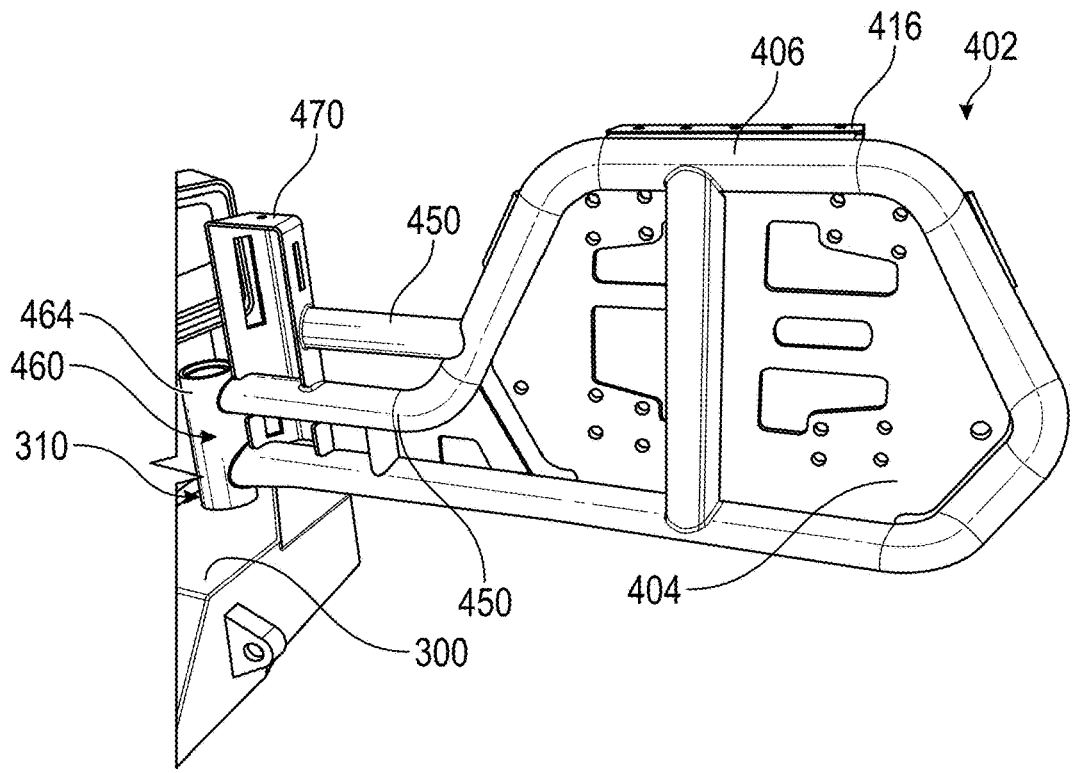

FIG. 1 illustrates an existing spare tire carrier assembly 200, known as an original equipment manufacturer (OEM) spare tire carrier, connected to a rear panel 102 of a vehicle 100. As shown, the carrier assembly 200 can include a tire carrier housing 202, a rear camera 206 such as a backup camera, a camera housing 204, a rear light mount 210, and a rear light 212. In some embodiments, the camera 206 can be protected by a camera cover 208 (FIG. 10). The rear light mount 210 can include light mount support posts 214. The tire carrier housing 202 can define channels for receiving the posts 214 of the rear light mount 210. The camera 206 and rear light 212 can be connected to electrical wiring 110. The electrical wiring 110 can extend through a channel in the tire carrier housing 202 and into an opening 104, such as a grommet, in the rear panel 102 of the vehicle 100. The tire carrier housing 202 can define a radial surface 203 for supporting a hub of a wheel supporting a tire. The carrier assembly 200 can be configured to hold a tire using fasteners 220, such as bolts. Cushions 108 can be attached to the rear panel 102 of the vehicle 100 to the lateral sides of the carrier assembly 200. The cushions 108 can form a buffer between a tire mounted on the carrier assembly 200 and the rear panel of the vehicle 100. The carrier assembly 200 can be attached directly to the tailgate or sheet metal of a rear panel 102 of the vehicle 100. This can lead to damage to the vehicle 100, such as to the tailgate or sheet metal of the rear panel 102 of the vehicle 100, due to the weight of some tires. Accordingly, it can be advantageous to reinforce the sheet metal of the rear panel 102 of the vehicle 100 and to space the existing spare tire carrier assembly 200 away from the rear panel 102 of the vehicle 100.

FIGS. 2-6 illustrate an embodiment of a swing away support assembly 400 configured to reposition the existing spare tire carrier assembly 200 to provide additional support and reinforcement for heavy objects, such as heavy tires, and to space the existing spare tire carrier assembly 200 away from the rear panel 102 of the vehicle 100. The swing away support assembly 400 can enable the existing spare tire carrier assembly 200 to be positioned in several different configurations and can provide for greater customization. For example, as discussed in detail below, the swing away support assembly 400 can provide different options for the height of the tire carrier housing 202 relative to the bumper or the ground beneath the vehicle 100, the height of the rear light 212 relative to the tire carrier housing 202, and the distance between the rear panel 102 of the vehicle 100 and the tire carrier housing 202.

The swing away support assembly 400 can be mounted on a vehicle 100, such as a Jeep. The support assembly 400 can be attached to a rear portion of the vehicle 100, such as to a bumper or rear panel 102 of the vehicle 100. In some embodiments, the support assembly 400 can be mounted on top of a hinge reinforcement 114 that is attached to the rear panel 102 of the vehicle (as shown mounted to the vehicle 100 in FIG. 1). In some embodiments the existing bumper 112 of the vehicle 100 can be replaced with a bumper that is compatible with the support assembly 400. In some embodiments, modifications can be made to the existing bumper 112 to make it compatible with the support assembly 400, such as drilling a mounting hole into the existing bumper 112. In some embodiments, the swing away support assembly 400 can be mounted on the vehicle 100 prior to removing the existing spare tire carrier assembly 200 from the rear panel 102 of the vehicle 100.

Figure 3:
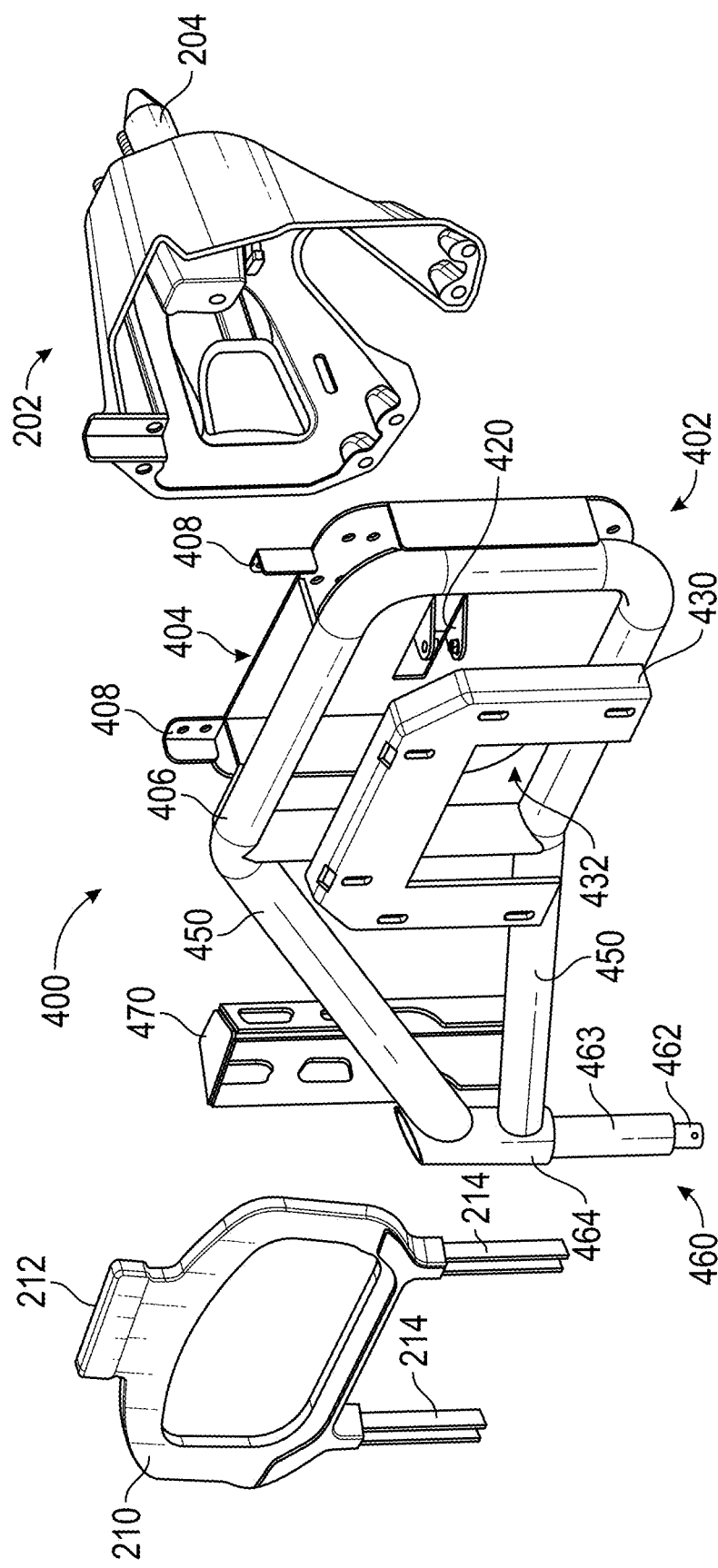
Figure 4:
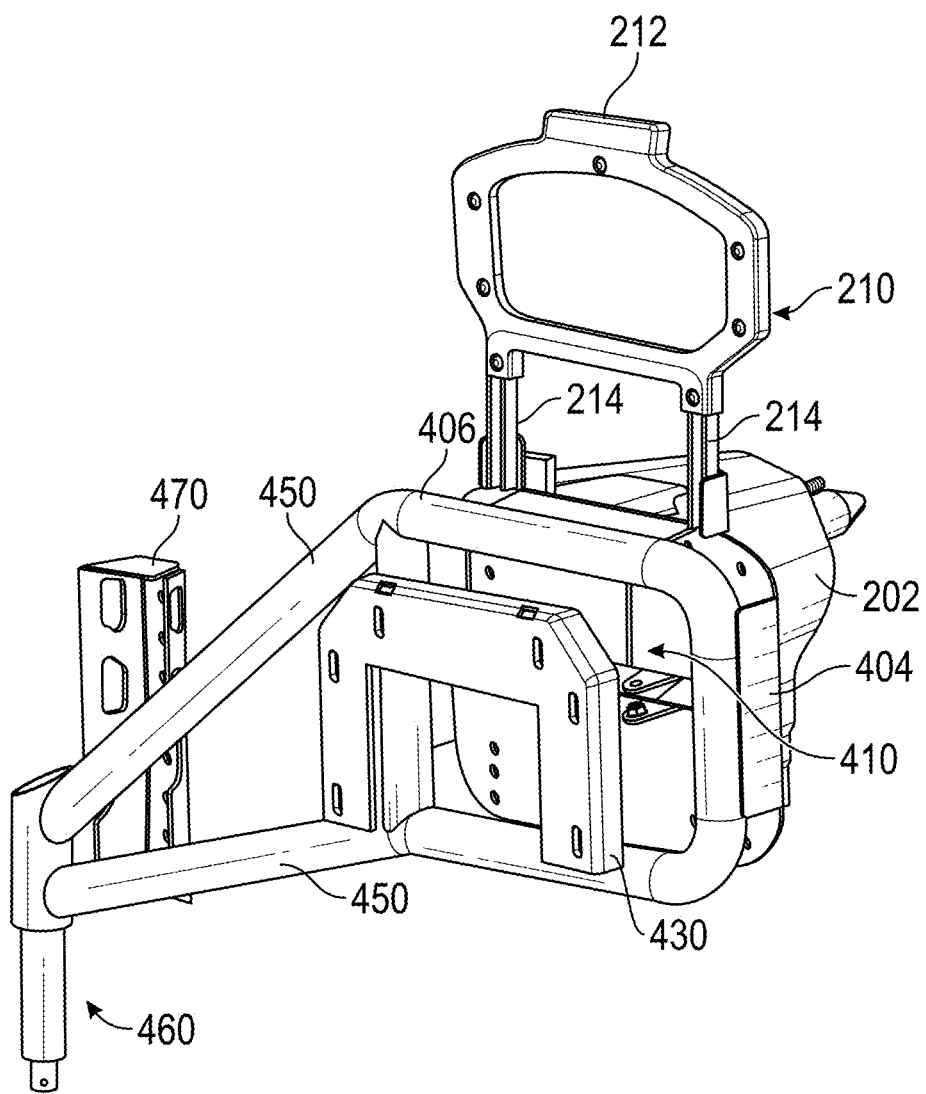

As shown, the swing away support assembly 400 can include a main body 402, a vehicle mount 430, an arm 450, and a pivot 460. The swing away support assembly 400 can optionally include an accessory mount 470. The swing away support assembly 400 can be coupled to the vehicle 100 in at least two locations, such as at a first location on the bumper and at a second location on the rear panel 102 of the vehicle 100 (e.g., via the vehicle mount 430). The pivot 460 can be a rotatable component configured to be attached to the vehicle 100, such as to a bumper or tailgate of the vehicle 100. The arm 450 can extend between, and connect, the pivot 460 and the main body 402. The main body 402 can include a support platform 404 and a frame 406. The structure of the main body 402 can allow for attachment of the existing spare tire carrier assembly 200 to the swing away support assembly 400. For example, the support platform 404 can include a plurality of holes 412 that correspond with a bolt pattern of the existing spare tire carrier assembly 200. The vehicle mount 430, as shown in FIG. 3, can be configured to attach to the rear panel 102 of the vehicle 100 and to connect the main body 402 of the swing away support assembly 400 to the vehicle 100.

Advantageously, the swing away support assembly 400 allows for the existing spare tire carrier assembly 200, such as an OEM carrier, to be removed from the sheet metal of the rear panel 102 of the vehicle 100 and attached to the main body 402 of the swing away support assembly 400, such as to the support platform 404. Thus, heavier tires can be attached to the carrier assembly 200 without damaging the vehicle 100. Further, the carrier assembly 200, including the rear camera 206 and the rear light 212, can be removed from the vehicle 100 and easily reattached to the main body 402 of the swing away support assembly 400. For example, the carrier assembly 200 can be removed from the vehicle 100 and reattached to the support platform 404 without disassembling or separating the components of the existing spare tire carrier assembly 200, such as the tire carrier housing 202, camera housing 204, rear light mount 210, camera 206, and rear light 212. In some embodiments, the electrical wiring 110 between the vehicle 100 and the camera 206 and/or between the vehicle 100 and the rear light 212 does not need to be disconnected (e.g., removed, cut, or otherwise disconnected) in order to remove the carrier assembly 200 from the rear panel 102 of the vehicle and reattach it to the swing away support assembly 400.

The pivot 460 can be a rotatable component configured to connect with a portion of the vehicle 100. For example, at least a portion of the pivot 460 can be inserted into a corresponding opening in a bumper. The pivot 460 can be stepped. For example, the pivot 460 can include two or more sections with different diameters. For example, as shown, the pivot 460 can include a first section 462, a second section 463, and a third section 464. The diameter of each section can be smaller than the diameter of the section (if any) above it. For example, the diameter of the first section 462 can be smaller than the diameter of the second section 463, which can be smaller than the diameter of the third section 464. The section of the pivot 460 with the widest diameter can be configured to sit above an upper surface of a bumper and the section(s) with the smaller diameter(s) can be configured to be inserted within the bumper. The section(s) of the pivot 460 that are inserted into the bumper can act as an anchor and the section(s) of the pivot 460 disposed above, or flush with, the upper surface of the bumper can be connected to at least one arm 450.

As shown, the swing away support assembly 400 can include at least one arm 450. The arms 450 can extend from and/or connect the pivot 460 to the main body 402 of the support assembly 400. The arms 450 can connect to the frame 406. The arms 450 and the frame 406 can be made of the same structure and/or material. The arms 450 and the frame 406 can merge and/or be integral in a single component.

The main body 402 of the swing away support assembly 400 can comprise a frame 406 and a support platform 404. The main body 402 can be a single component or an assembly of multiple components. The frame 406 can be a tubular structure defining a perimeter of the main body 402 and open in the center as shown. The shape of the frame 406 can be generally rectangular, square, or any other shape corresponding to the shape of the support platform 404. The support platform 404 can include apertures 410 to provide access and/or clearance for different purposes, such as to extend electrical wiring or a connector (e.g., a link) through. The support platform 404 can include holes 412 for fasteners, such as bolts, to be inserted into. The holes 412 can correspond to the bolt pattern of the tire carrier housing 202. At least some of the fasteners 220 that were originally used to attach the existing spare tire carrier assembly 200 to the rear panel 102 of the vehicle 100 can be repurposed or reused to connect components of the swing away support assembly 400 (e.g., to each other, to the existing spare tire carrier assembly 200, and/or to the vehicle 100). The support platform 404 can include more than one set of holes 412 which correspond to the bolt pattern of the tire carrier housing 202. For example, the support platform 404 can have two or more sets of holes 412 spaced apart from one another (e.g., vertically or horizontally). The different sets of holes 412 can allow the tire carrier housing 202 to be positioned in different locations on the support platform 404, which may be higher, lower, to the left, or to the right of the original position of the carrier assembly 200 on the rear panel 102 of the vehicle 100. This can advantageously allow for different sized tires, such as larger tires, to be mounted on the swing away support assembly 400.

The support platform 404 can include a link mount 420 that is configured to receive and/or connect to an end of a link. The link mount 420 can have an upper segment and a lower segment spaced apart from the upper segment. The upper and lower segments can extend outward from a face of the support platform 404 in a direction away from the vehicle 100 (when the support assembly 400 is attached to the vehicle 100). The upper and lower segments can be disposed above and below an aperture 410 in the support platform 404, respectively, such that an end of the link can extend through the aperture 410, between the upper and lower segments of the link mount 420. Each of the segments can define an opening for a fastener or connector to extend through. An end of the link can extend between the upper and lower segments of the link mount 420 and be secured by fasteners extending through the openings in the upper and lower segments.

Figure 5:
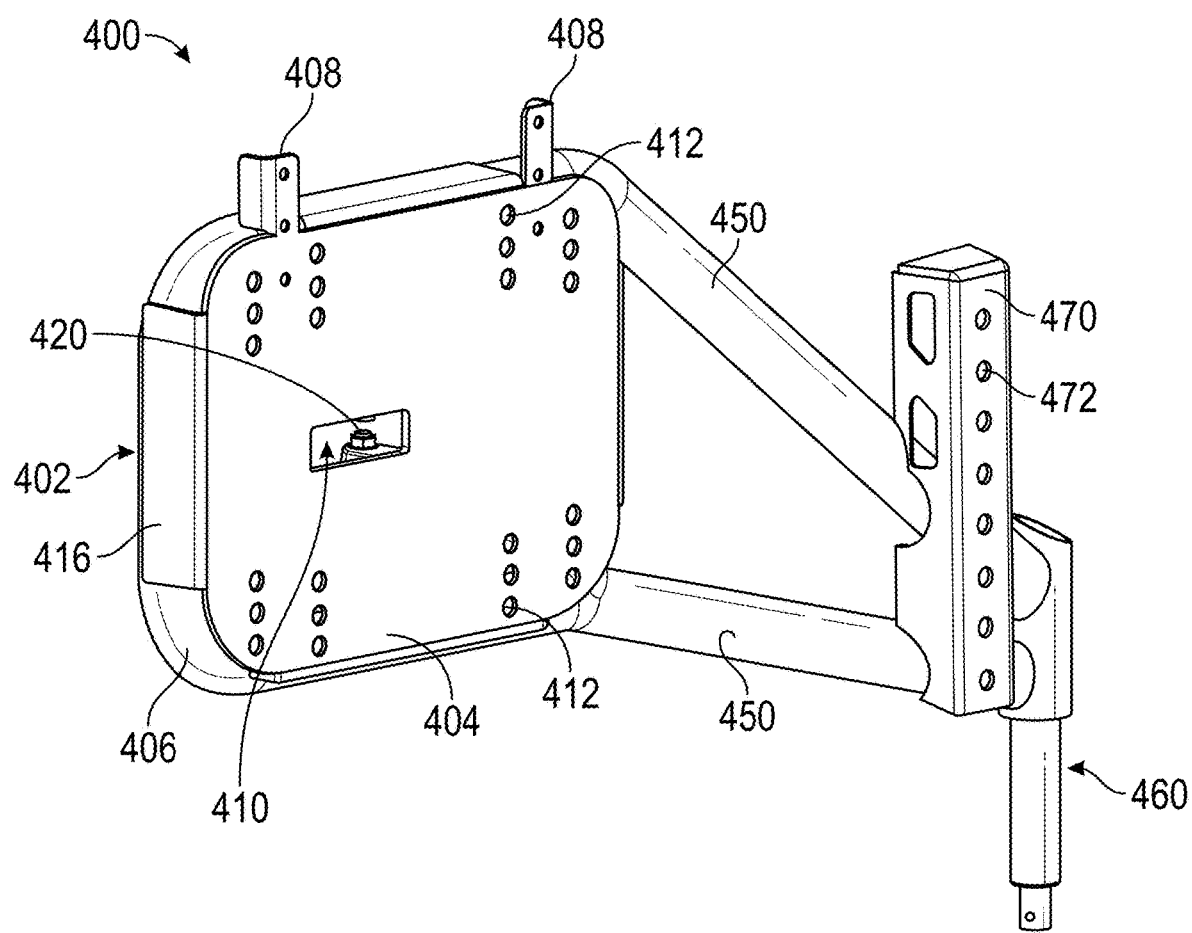
Figure 6:
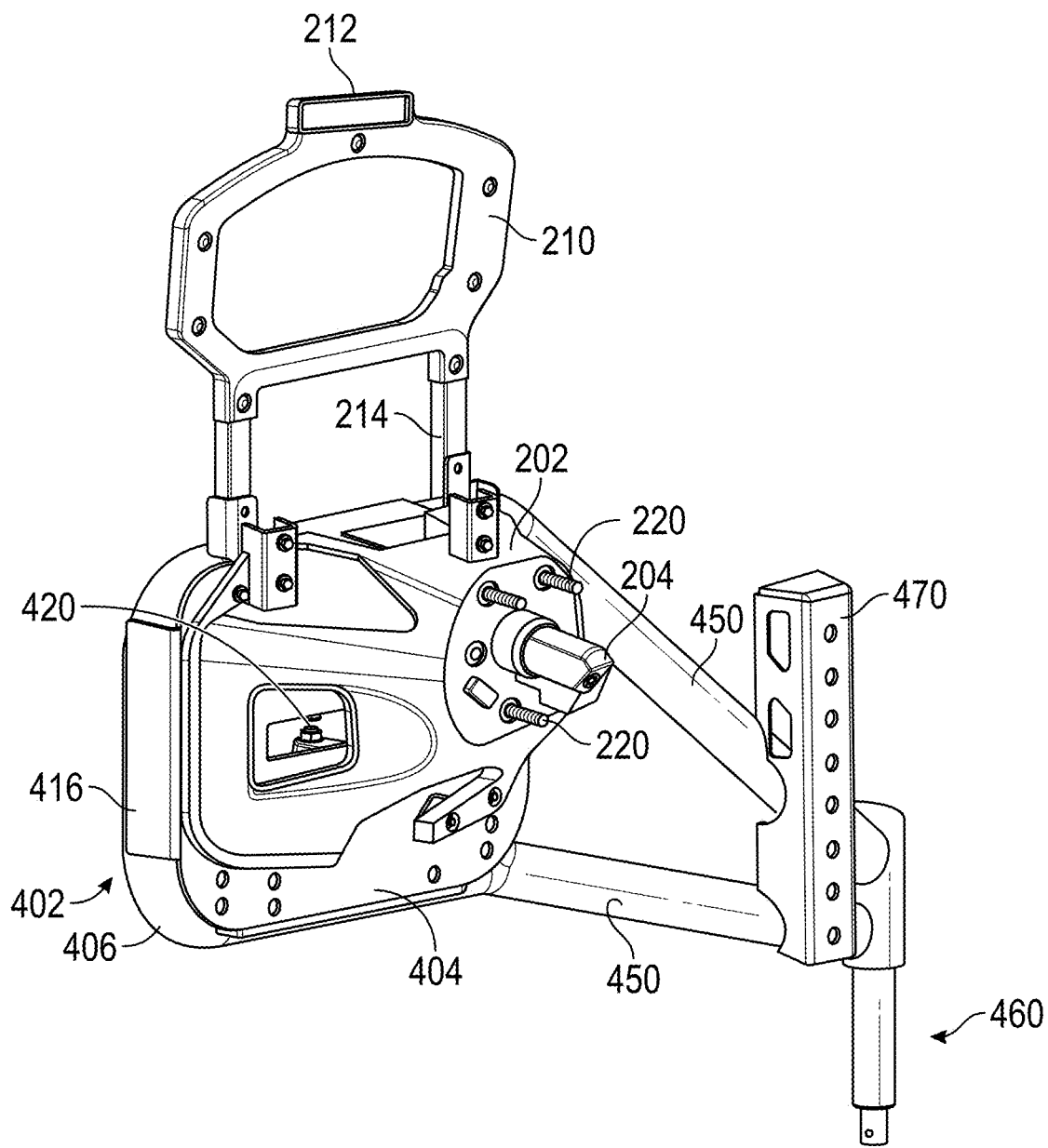

In some embodiments, the support platform 404 can include back light mount supports 408 (as shown in FIG. 5) configured to reinforce the light mount support posts 214 of the existing spare tire carrier assembly 200 when the carrier assembly 200 is connected to the support platform 404. The back light mount supports 408 can include multiple sets of openings for bolts to pass through, allowing the rear light mount 210 (and rear light 212) to be mounted at different heights relative to the support platform 404.

The support platform 404 can be a flat plate. The support platform 404 can be connected to the frame 406, forming the main body 402. The support platform 404 can include outer flanges 416 that extend around at least a portion of the frame 406. For example, as shown, the outer flanges 416 can extend from at least three sides of the support platform 404 and around at least a portion of three or more corresponding sides of the frame 406. In some embodiments, each outer flange 416 of the support platform 404 can include a plurality of accessory holes 414. The accessory holes 414 can be disposed at an angle relative to the ground beneath the vehicle 100. Various objects, such as a jack for a vehicle, can be mounted to the support platform 404 using the accessory holes 414.

In some embodiments, as shown, the swing away support assembly 400 can include an accessory mount 470. The accessory mount 470 can include openings 472 along a front surface of the mount 470. Various objects, such as vehicle accessories, can be mounted to the accessory mount 472 via the openings 472.

The vehicle mount 430 of the swing away support assembly 400 can be configured to attach to the rear panel 102 of the vehicle 100. The vehicle mount 430 can include an opening 432 through which a vent panel 106 on the vehicle 100 can extend. In some embodiments, the opening 432 is defined by at least three edges or sides. The vehicle mount 430 can include a link mount 440 that is configured to receive and/or connect to an end of a link. The link mount 440 can have an upper segment and a lower segment spaced apart from the upper segment. Each of the segments can define an opening for a fastener or connector to extend through. An end of the link can extend between the upper and lower segments of the link mount 440 and be secured by fasteners extending through the openings in the upper and lower segments.

Figure 8:
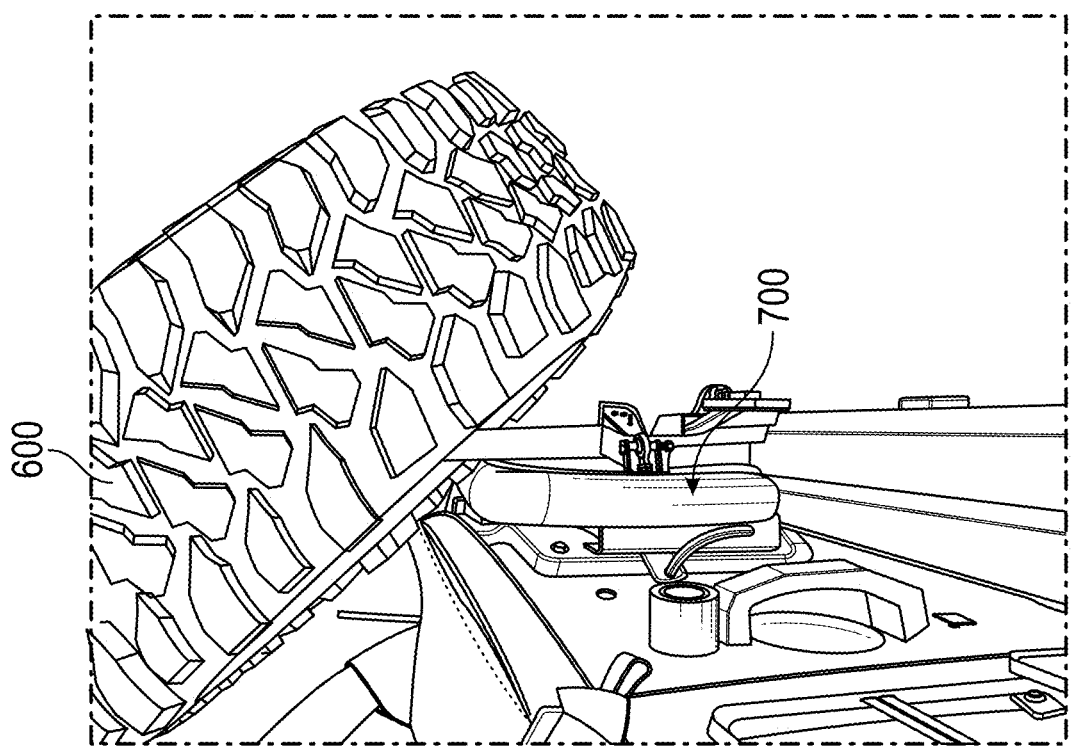
FIGS. 7-8 illustrate an embodiment of a support assembly with an attached tire as disclosed herein.
Figure 7:
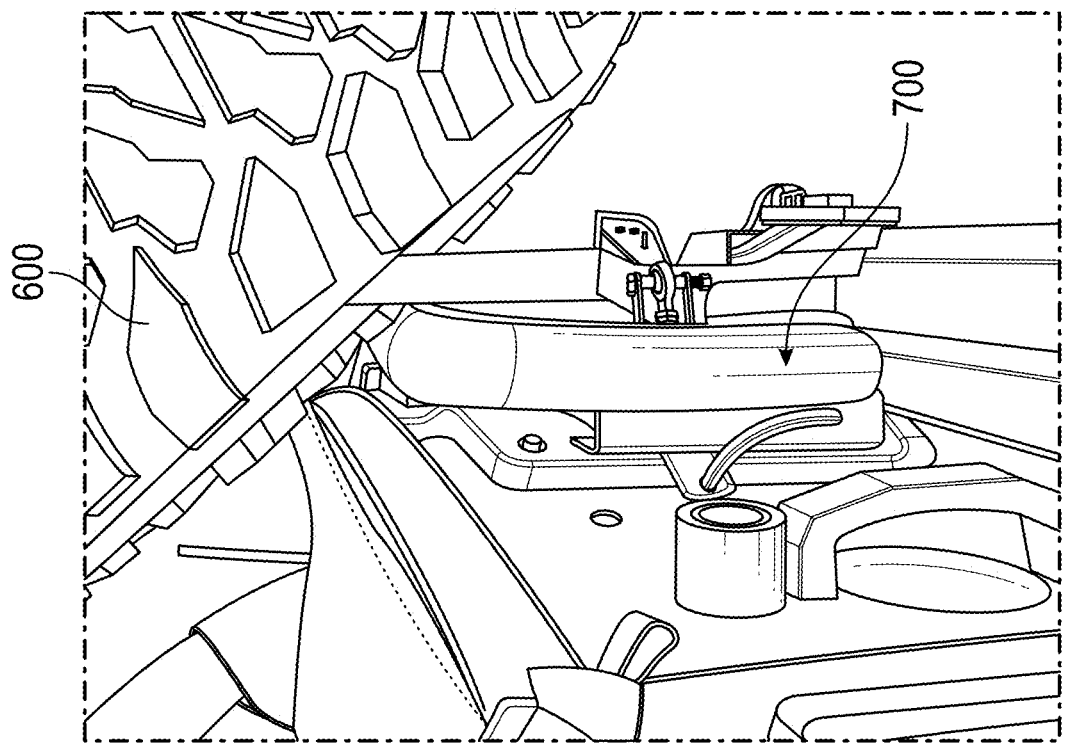

FIGS. 7-8 illustrate an embodiment of a support assembly 700. The support assembly 700 can have the same or similar features and/or functions as the swing away support assembly 400, except as otherwise described. In some embodiments, the support assembly 700 can secure a tire 600 at an angle relative to a vertical plane. This can advantageously accommodate larger tires as the angled tire can be oriented such that it does not come into contact with any other vehicle components. As shown, in some embodiments, the rear light can be positioned at least partially below the support assembly 700.

Figure 9:
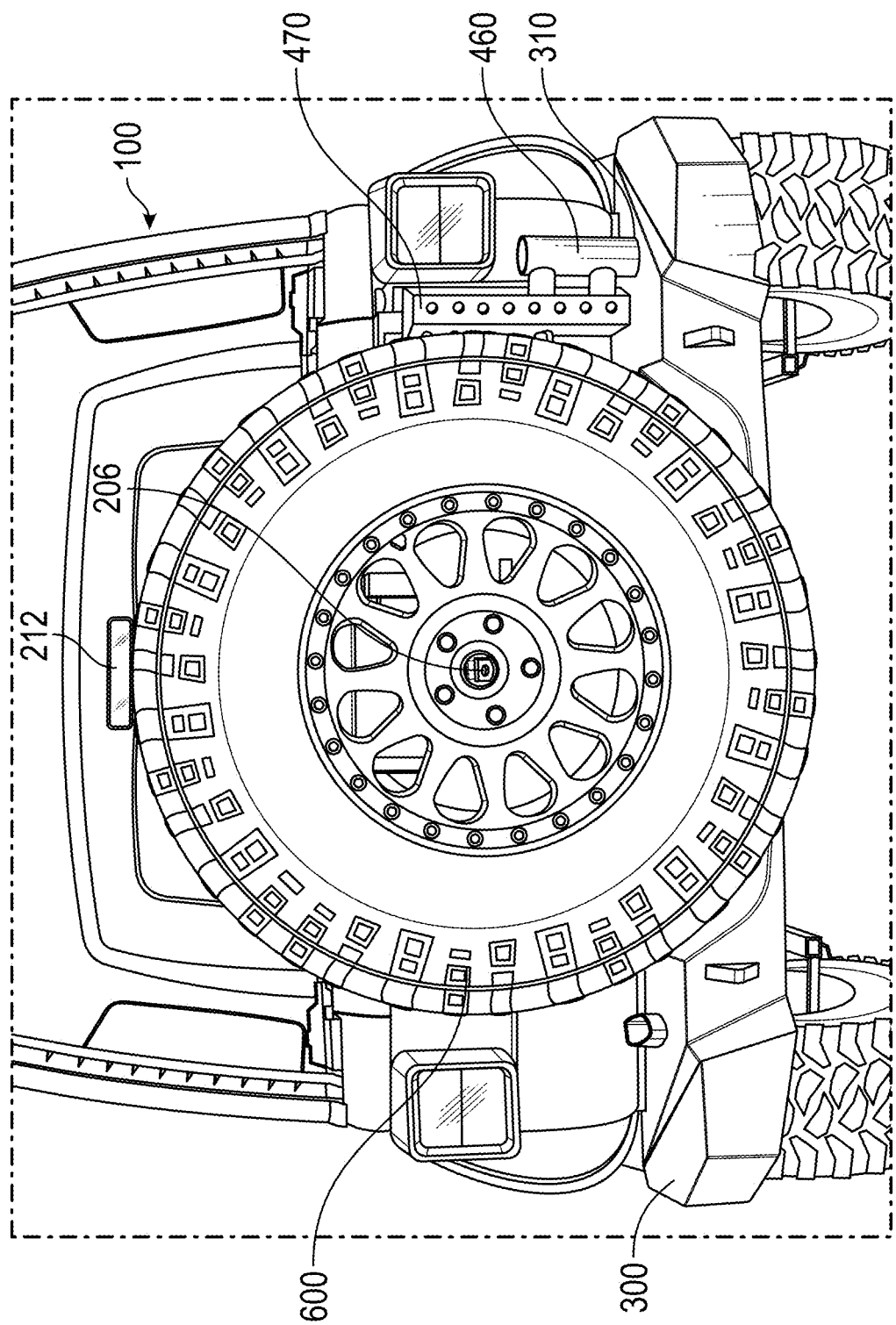
FIG. 9 illustrates an embodiment of a swing away support assembly with the existing spare tire carrier assembly of FIG. 1 and a tire attached.

FIG. 9 illustrates another embodiment of a swing away support assembly 400' attached to the vehicle 100 and supporting the attached existing spare tire carrier assembly 200 and tire 600. The support assembly 400' can have the same or similar features and/or functions as the swing away support assembly 400, except as otherwise described. As shown, when the swing away support assembly 400' is mounted on the vehicle 100 and the tire 600 is attached, at least a portion of the rear light 212 is positioned above the tire 600. The swing away support assembly 400' can advantageously position large tires such that there is sufficient clearance for large tires, while also maintaining visibility of the rear light 212, which provides road safety benefits.

FIGS. 10-39 illustrate embodiments of a method of installing the swing away support assembly 400'. As illustrated in FIG. 10, the existing spare tire carrier assembly 200 can be attached to the rear panel 102 of the vehicle 100. The hinge reinforcement 114 can optionally be attached to the rear panel 102. As shown in FIGS. 11-15, the swing away support assembly 400' can be mounted to the bumper 300. For example, the bumper 300 can have a pivot mount 310, such as a hole in the bumper 300 that is configured to receive at least a portion of the pivot 460 of the support assembly 400'. The pivot mount 310 can be located towards a lateral end of the bumper 300, in a location more lateral than the hinges of the vehicle's tailgate when the bumper 300 is mounted on the vehicle 100. As shown, at least a portion (e.g., a section) of the pivot 460 can be inserted into the pivot mount 310 on the bumper 300. If the existing bumper on the vehicle is not already compatible with the support assembly 400', the existing bumper can be replaced with the bumper 300 or modified to accommodate the pivot 460 of the support assembly 400' (e.g., by forming a corresponding opening in the bumper). As shown, the pivot 460 can be connected to the bumper 300 prior to removing the existing spare tire carrier assembly 200 from the rear panel 102. The support assembly 400 can be connected to the bumper 300 such that the support assembly 400 is initially spaced away from (e.g., swung open relative to) the carrier assembly 200 that is mounted on the rear panel 102 of the vehicle 100.

Figure 16:
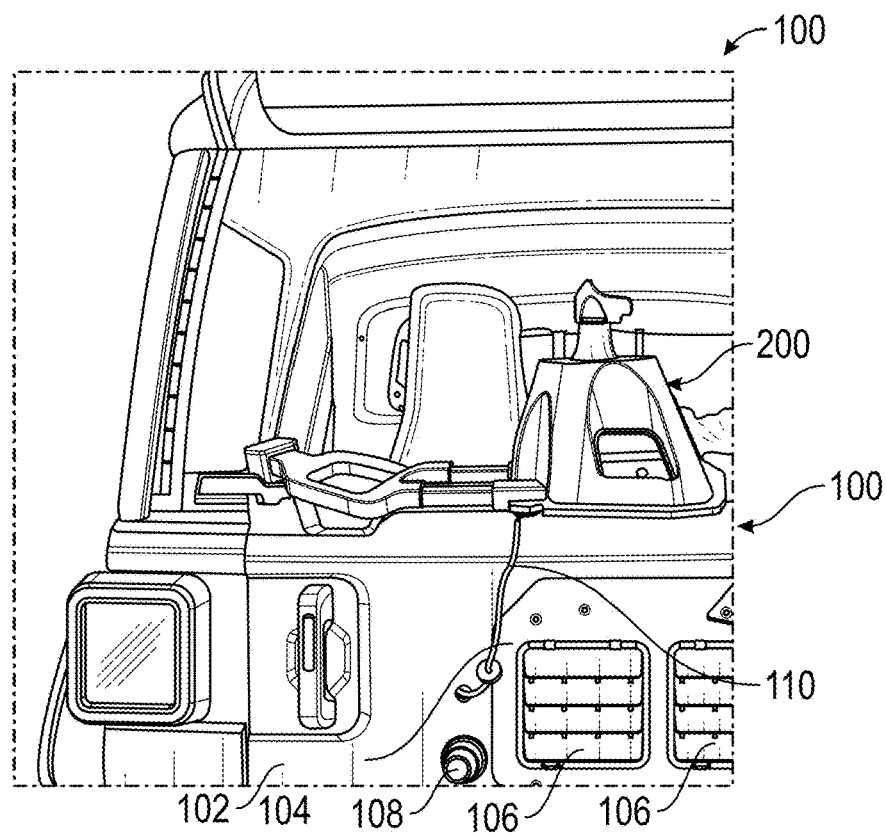
FIG. 16 illustrates the existing spare tire carrier assembly of FIGS. 1 and 10 removed from a rear panel of the vehicle while maintaining an electrical connection to the vehicle.
Figure 17:
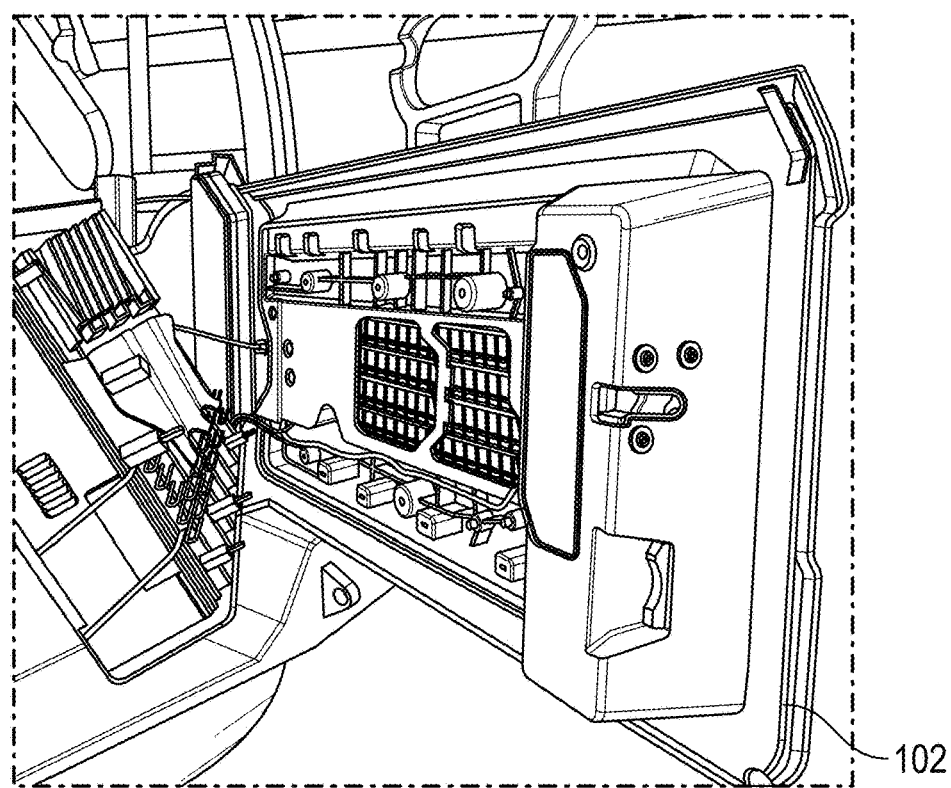
FIGS. 17-18 illustrate a method of disconnecting the existing spare tire carrier assembly from the electrical connection of the vehicle.
Figure 18:
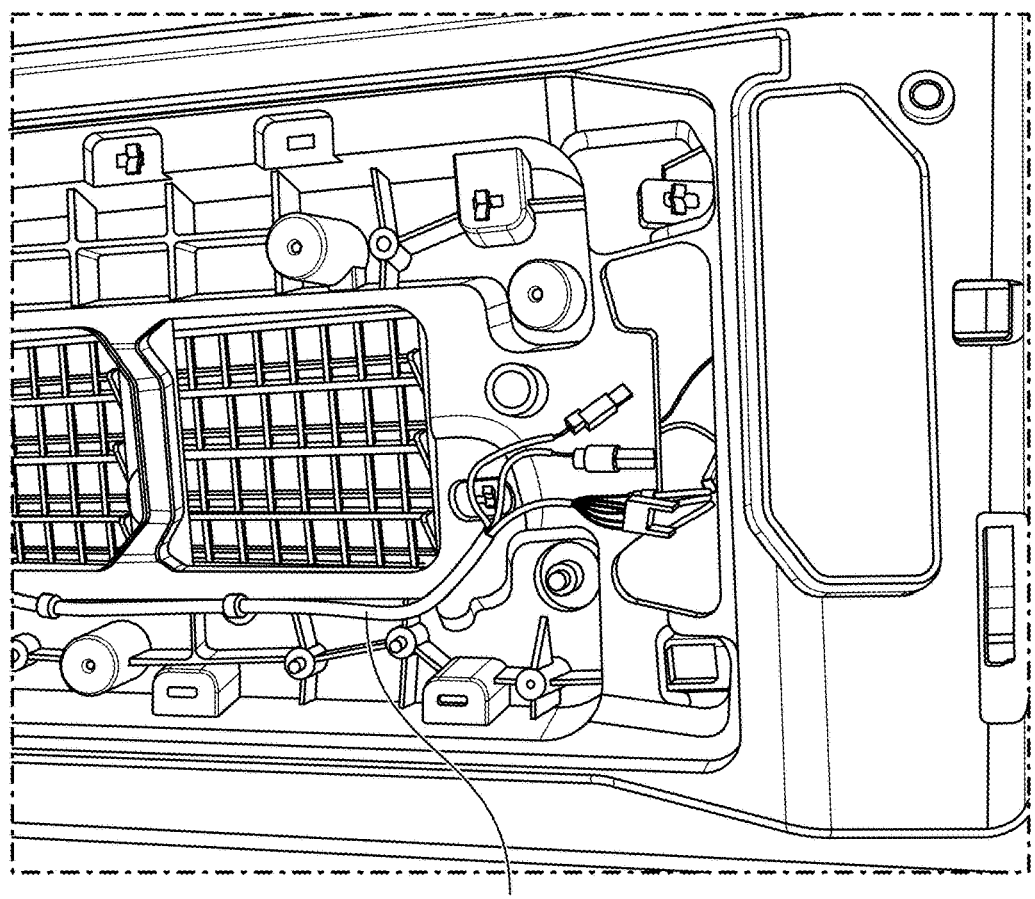

The carrier assembly 200 is removed from the rear panel 102 of the vehicle 100 so that it can be mounted on the support assembly 400'. The carrier assembly 200 can be removed as a single unit. For example, the tire carrier housing 202, rear light mount 210, rear camera 206, and rear light 212 can remain connected as a single unit when the carrier assembly 200 is removed from the rear panel 102 of the vehicle 100. In some embodiments, as illustrated in FIG. 16, the electrical wiring 110 from the vehicle 100 can remain connected to the carrier assembly 200 when the carrier assembly 200 is removed from the rear panel 102 of the vehicle. For example, the electrical wiring 110 connecting the rear camera 206 to the vehicle 100 and/or the electrical wiring 110 connecting the rear light 212 to the vehicle 100 can remain connected when the carrier assembly 200 is removed from the rear panel 102. In some embodiments, as illustrated in FIGS. 17-18, a cover on the back of the vehicle tailgate can be removed and the electrical wiring 110 between the vehicle 100 and the rear camera 206 and/or the vehicle 100 and the rear light 212 can be disconnected.

Figure 19:
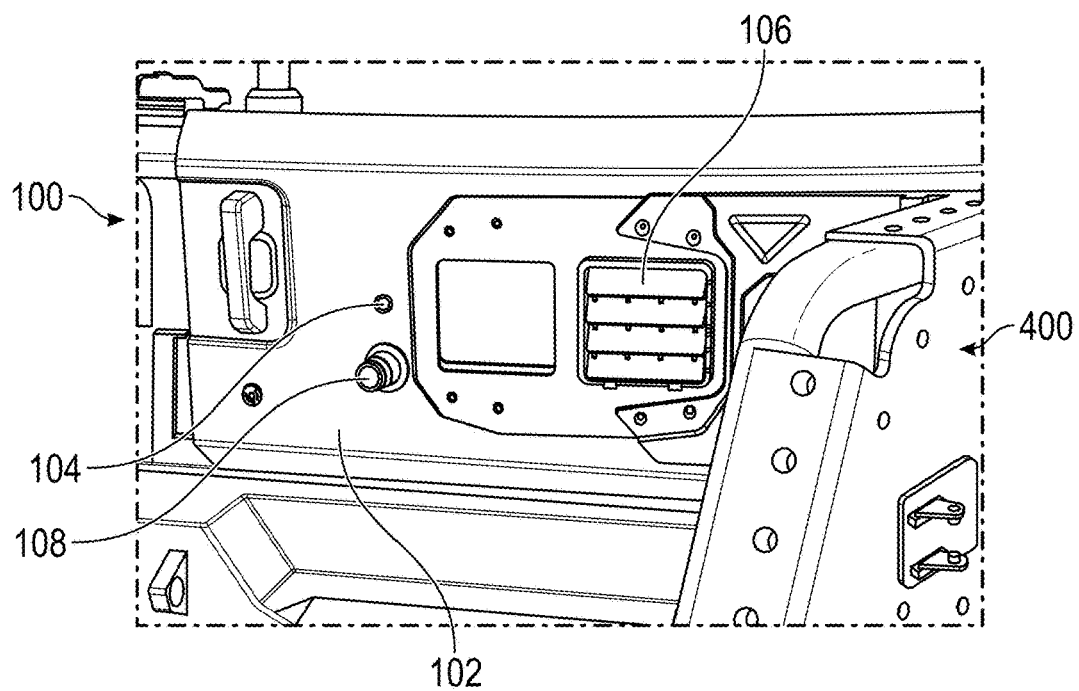
FIG. 19 illustrates the rear panel of the vehicle with the existing spare tire carrier assembly and a vent panel removed.
Figure 20:
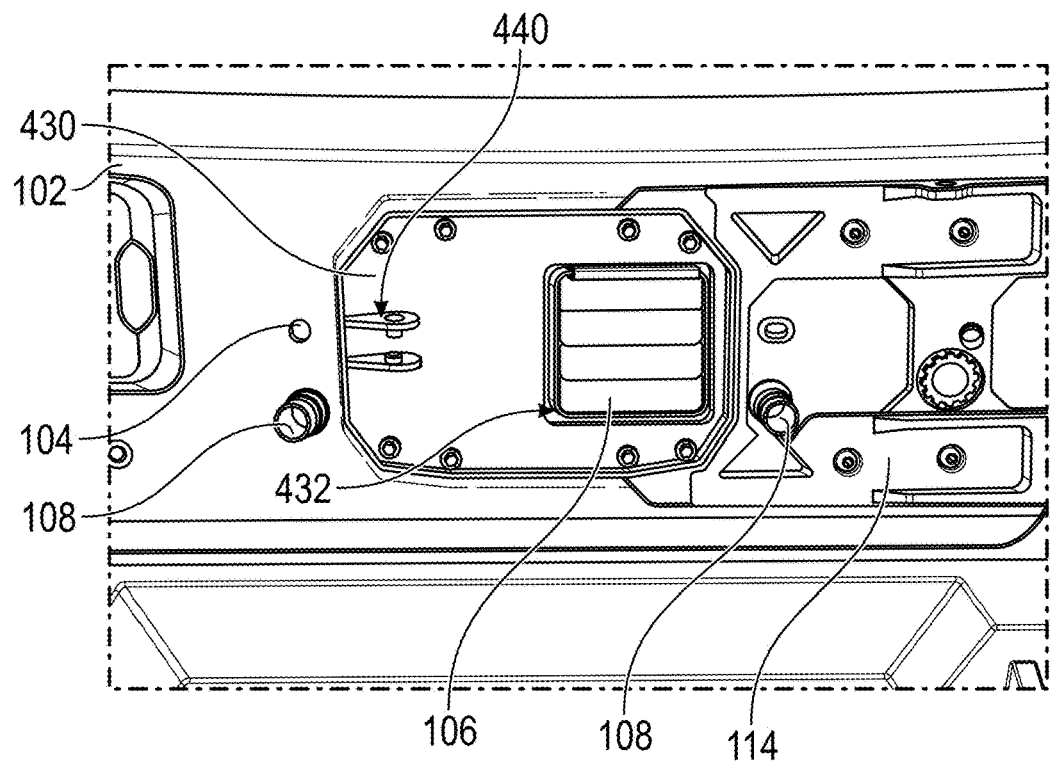
FIG. 20 illustrates an embodiment of a vehicle mount mounted on the rear panel of the vehicle.

At least one vent panel 106 on the rear panel 102 of the vehicle 100 can be removed, as illustrated in FIG. 19. This can allow for a tighter seal and/or closer fit between the vehicle mount 430 and the rear panel 102 of the vehicle. As shown in FIG. 20, the vehicle mount 430 can be attached to the rear panel 102 of the vehicle 100. In some embodiments, a portion of the vehicle mount 430 contacts a portion of the optional hinge reinforcement 114 when the vehicle mount 430 is connected to the rear panel 102. The vehicle mount 430 can be positioned such that the opening 432 in the vehicle mount 430 provides an opening for at least one of the vent panels 106 to extend through. In some embodiments, the vehicle mount 430 is connected to the rear panel 102 using at least some of the fasteners 220 that had previously connected the existing spare tire carrier assembly 200 to the rear panel 102 of the vehicle 100.

Figure 21:
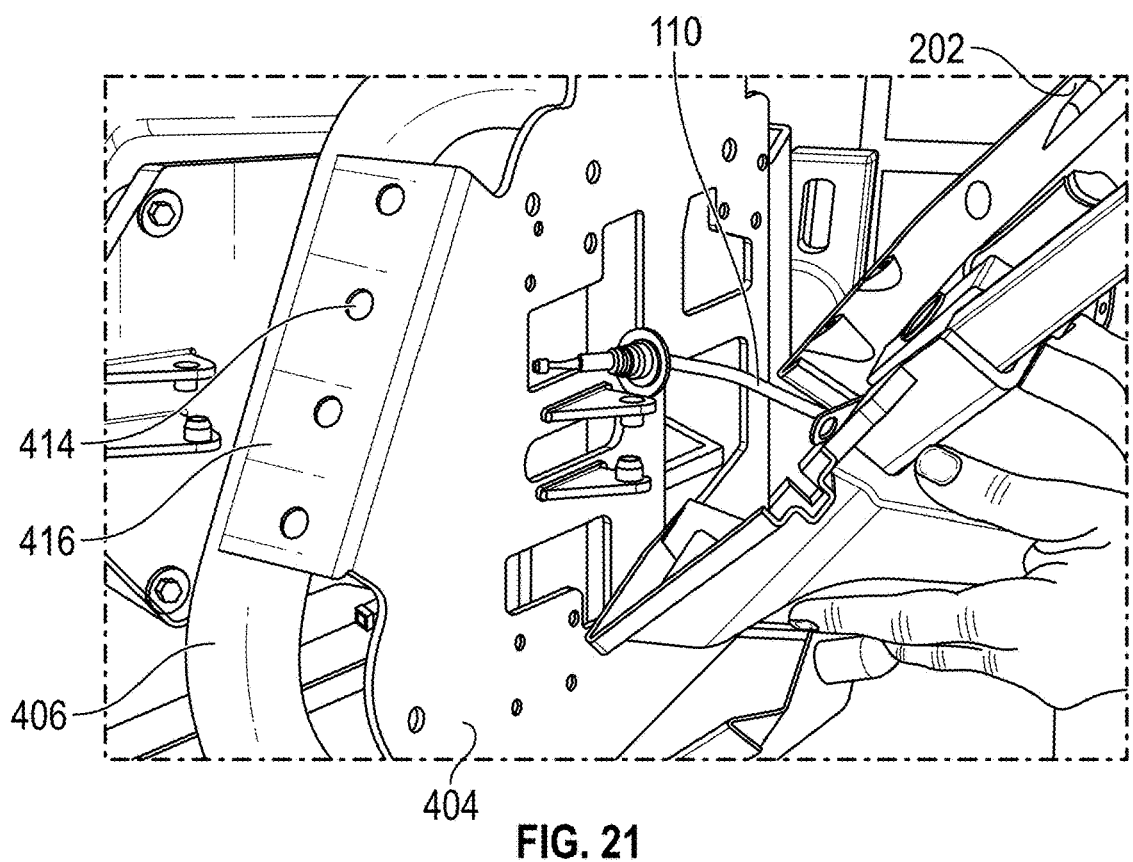
FIGS. 21-24 illustrate a method of attaching the existing spare tire carrier assembly to the swing away support assembly and routing electrical wire from the existing spare tire carrier assembly through an aperture in the support platform of the swing away support assembly.
Figure 22:
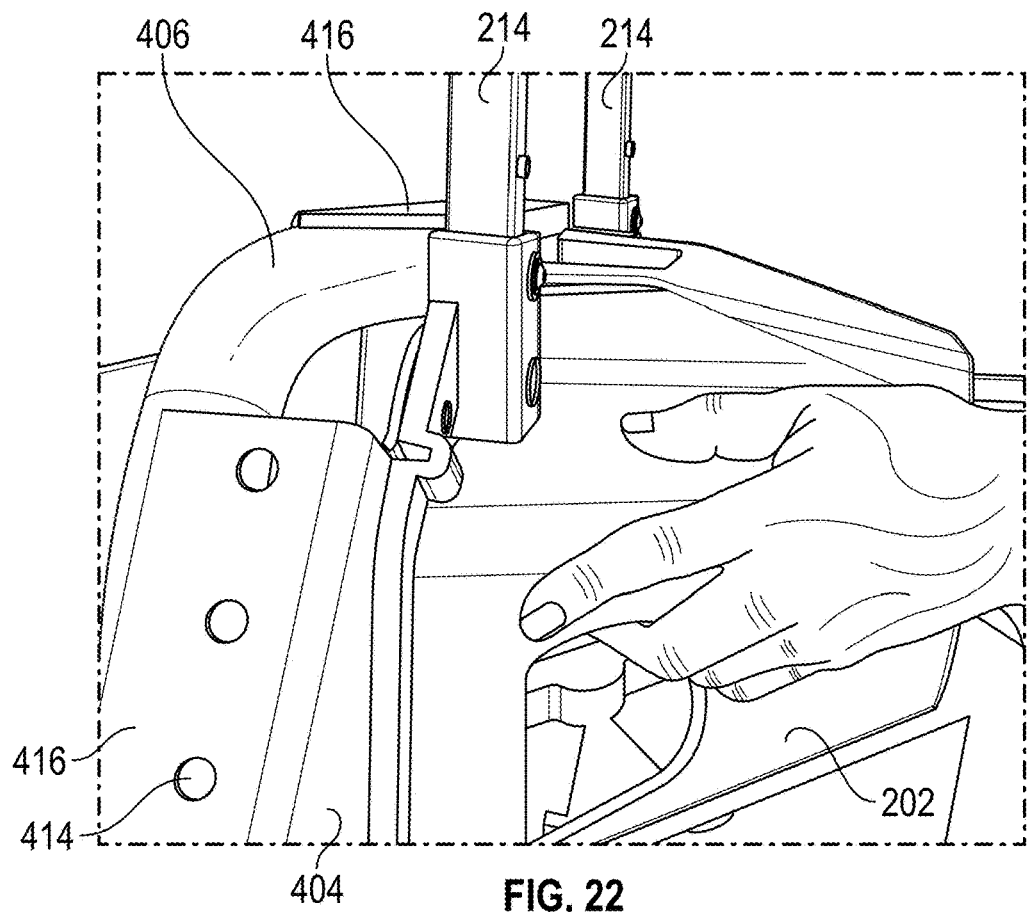
Figure 23:
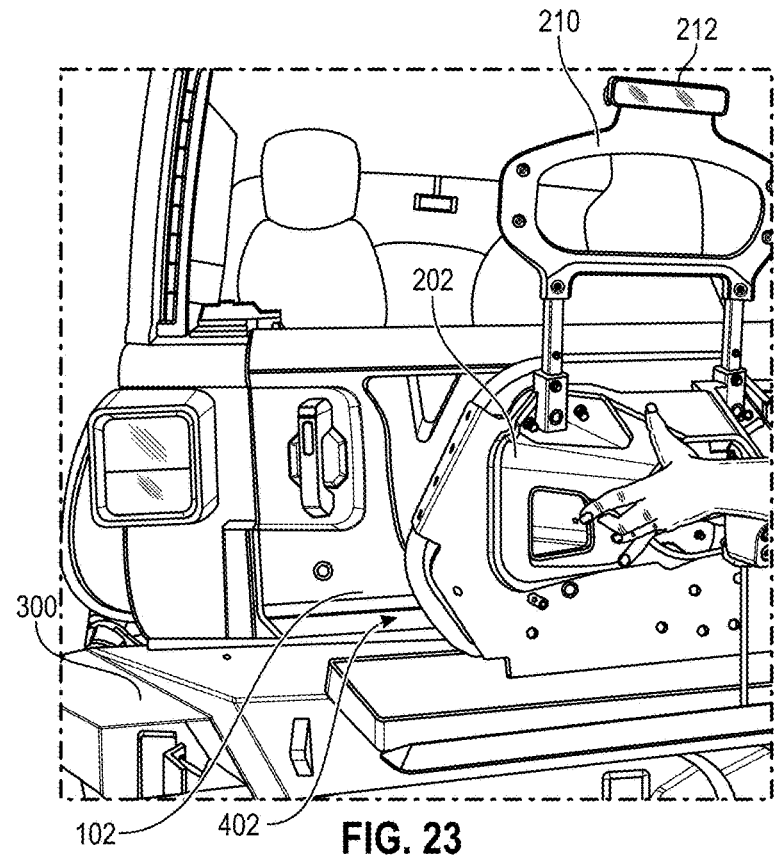
Figure 24:
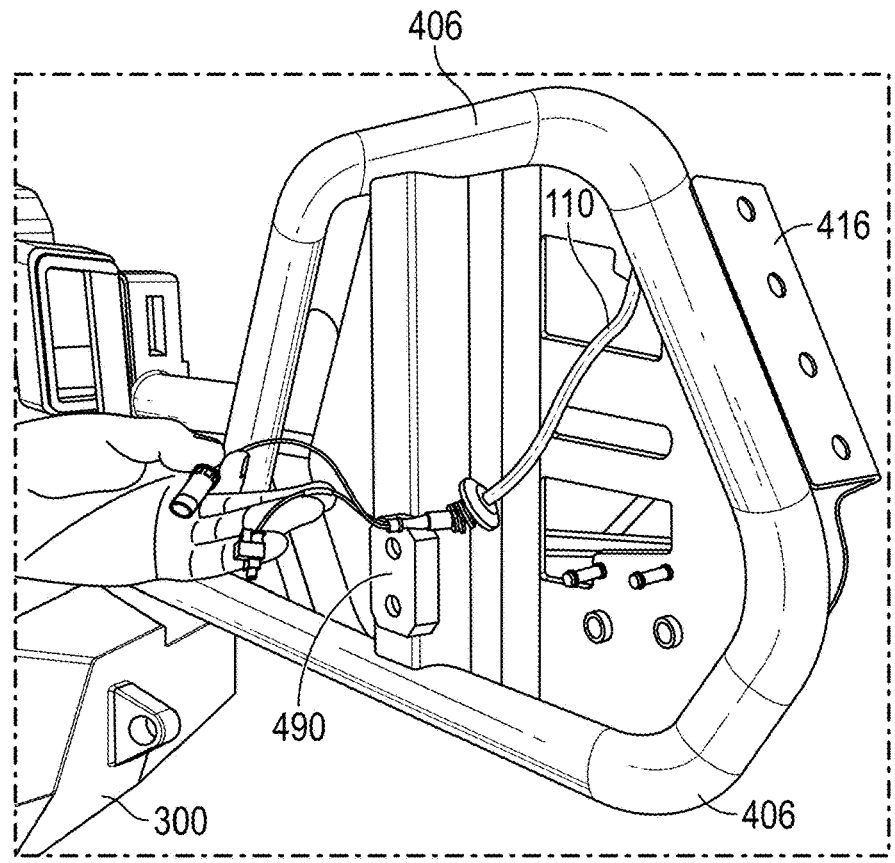
Figure 25:
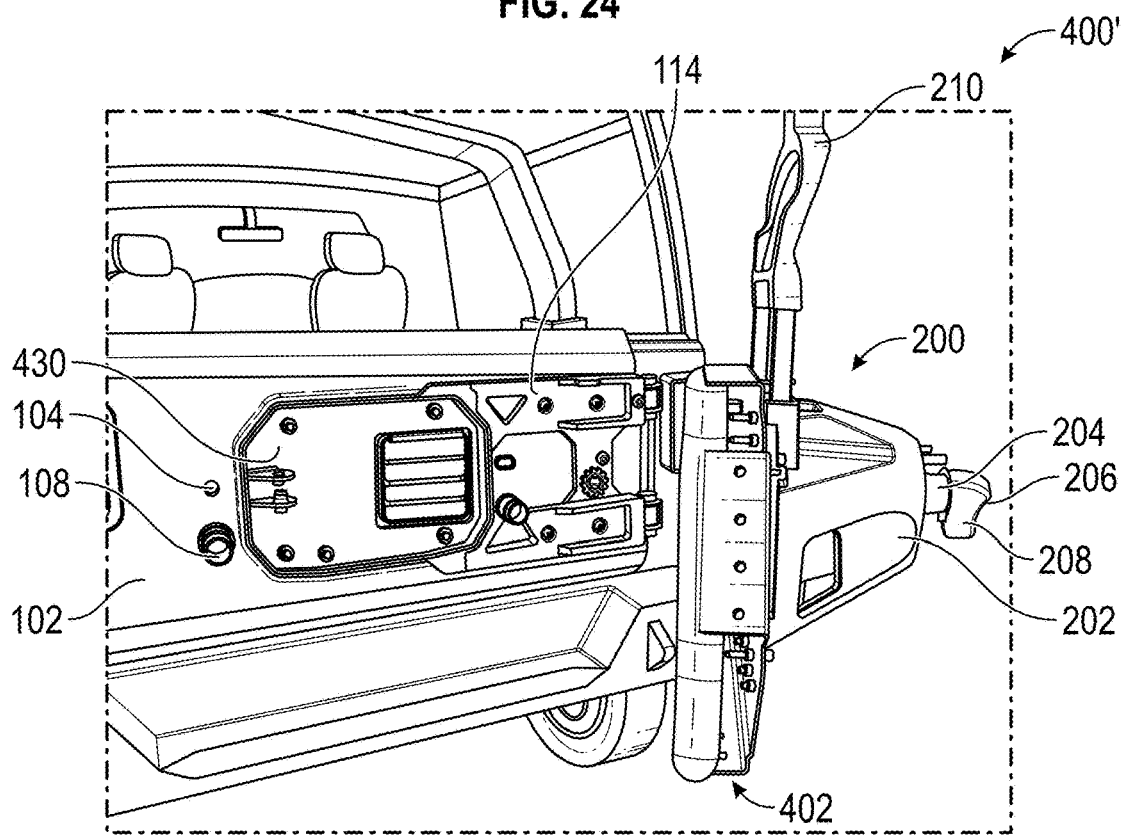
FIG. 25 illustrates the existing spare tire carrier assembly attached to a main body of the swing away support assembly and spaced apart from the rear panel of the vehicle.
Figure 26:
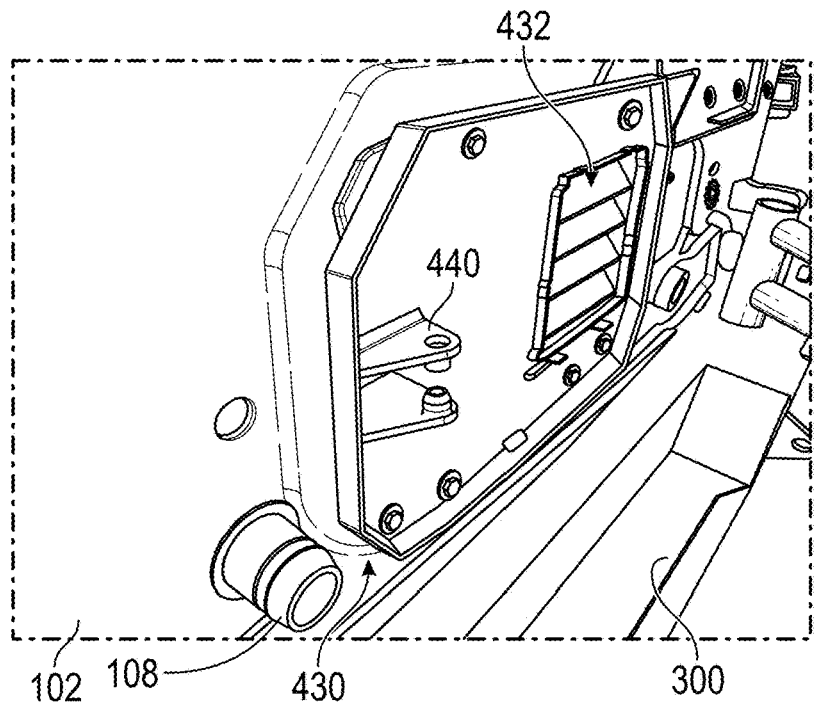
FIG. 26 illustrates the vehicle mount of the swing away support assembly attached to the rear panel of the vehicle.

FIGS. 21-24 illustrate a method of mounting the existing spare tire carrier assembly 200 on to the swing away support assembly 400'. The carrier assembly 200 can be attached to the support assembly 400' in a single step. For example, as shown in FIG. 23, the carrier assembly 200 can be mounted on to the support assembly 400' as a single unit (e.g., with the tire carrier housing 202, rear light mount 210, rear camera 206, and rear light 212 still assembled together). The electrical wiring 110 can extend between the carrier assembly 200 and the vehicle 100 through the aperture(s) 410 in the support platform 404 of the support assembly 400', as illustrated in FIGS. 21 and 24.

A stop 490 can be mounted on the back of the main body 402 of the support assembly 400', as shown in FIG. 24. The stop 490 can be made of rubber or another soft material configured to reduce friction. The stop 490 can reduce the amount of friction and/or wear experienced by the tailgate and/or rear panel 102 of the vehicle 100 as a result of the tailgate door being swung open and closed in use.

Figure 27:
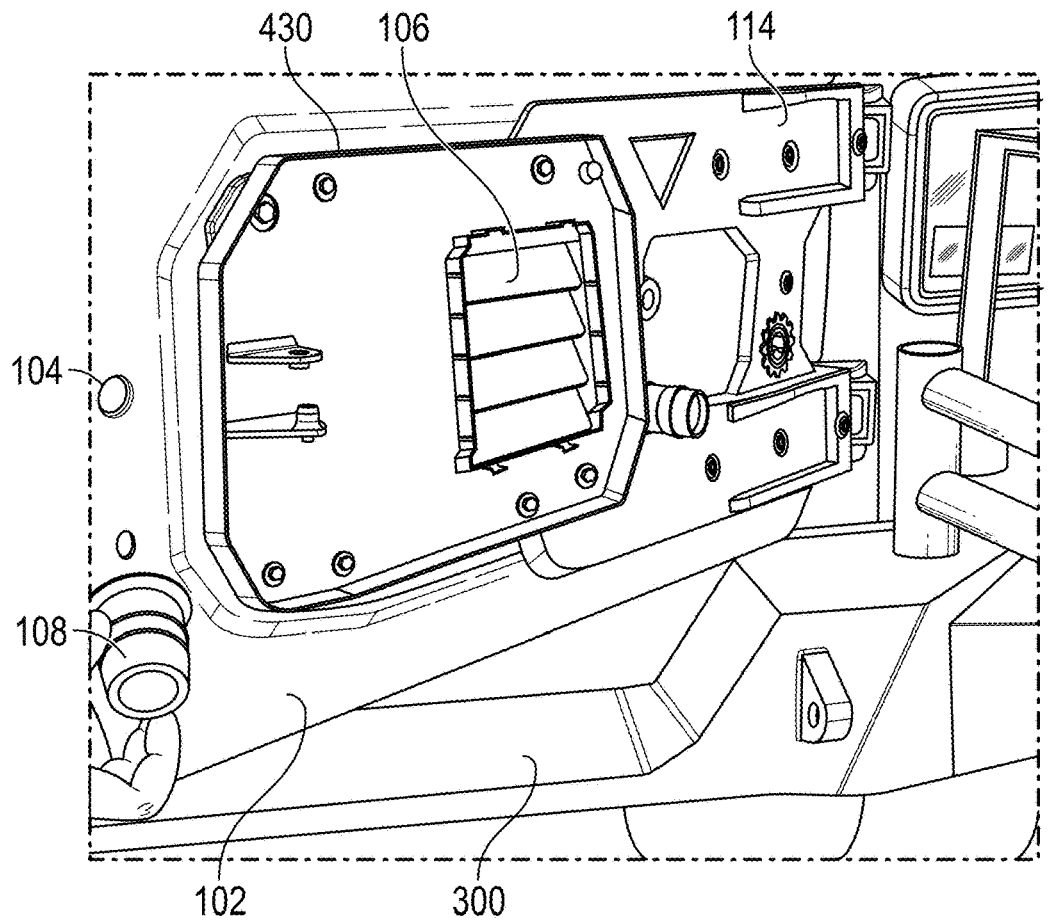
FIGS. 27-28 illustrate a method of removing a cushion from the rear panel of the vehicle and attaching it to the support platform of the swing away support assembly.
Figure 28:
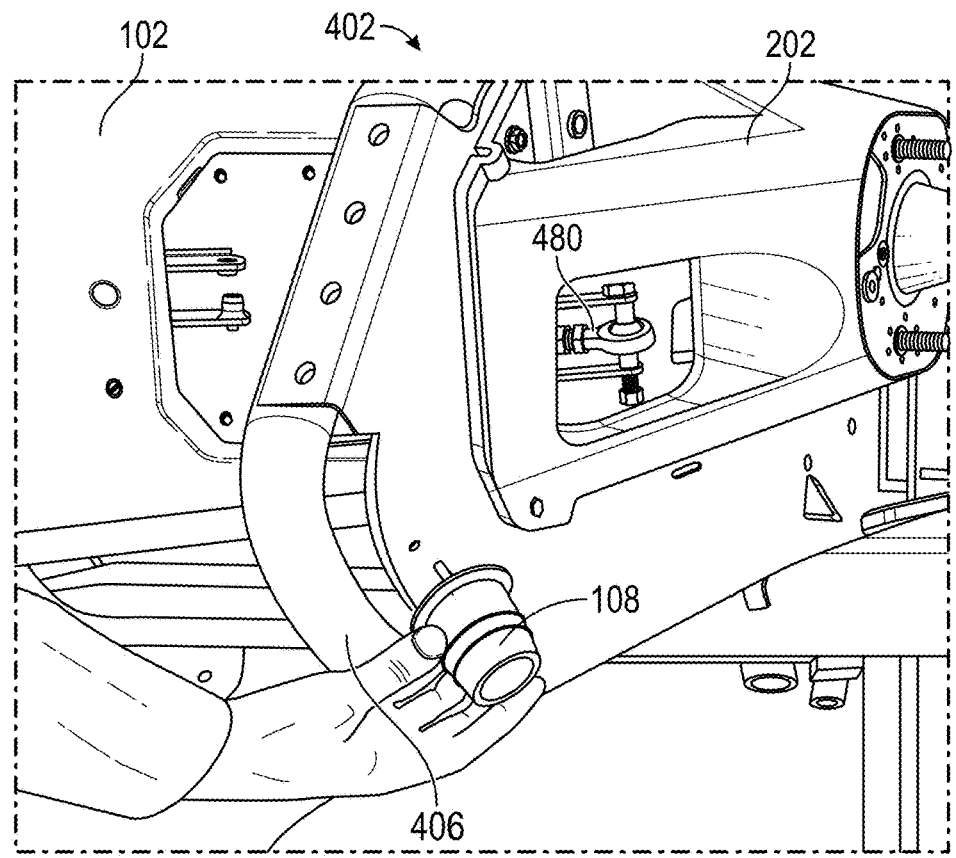

The cushion(s) 108 that are mounted on the rear panel 102 of the vehicle 100 can be removed from the rear panel 102 and reattached to the support platform 404 of the swing away support assembly 400', as illustrated in FIGS. 27-28. This can advantageously create a buffer between the support platform 404 and a tire that is loaded onto the carrier assembly 200, reducing the risk of damage to the support assembly 400'.

Figure 29:
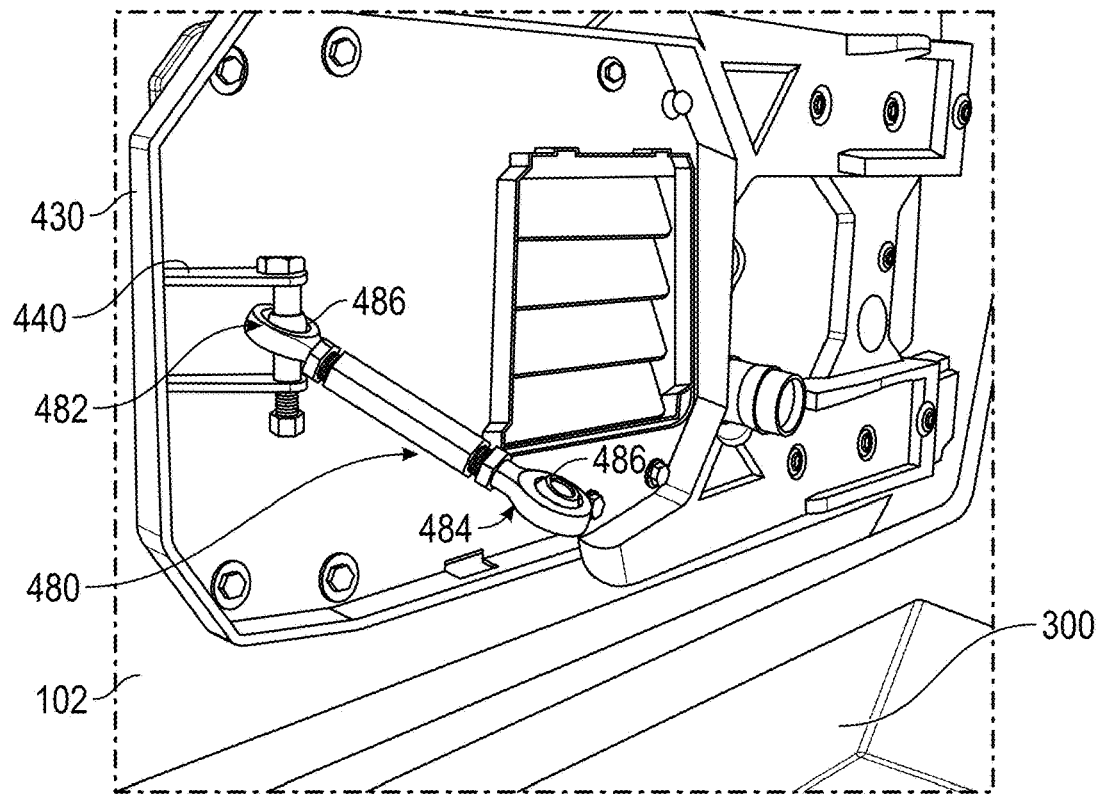
FIGS. 29-30 illustrate a method of connecting the main body of the swing away support assembly to the vehicle mount by attaching a first end of a link with a rotatable connector to a link mount on the vehicle mount and attaching a second end of the link with a rotatable connector to a link mount on the main body.
Figure 30:
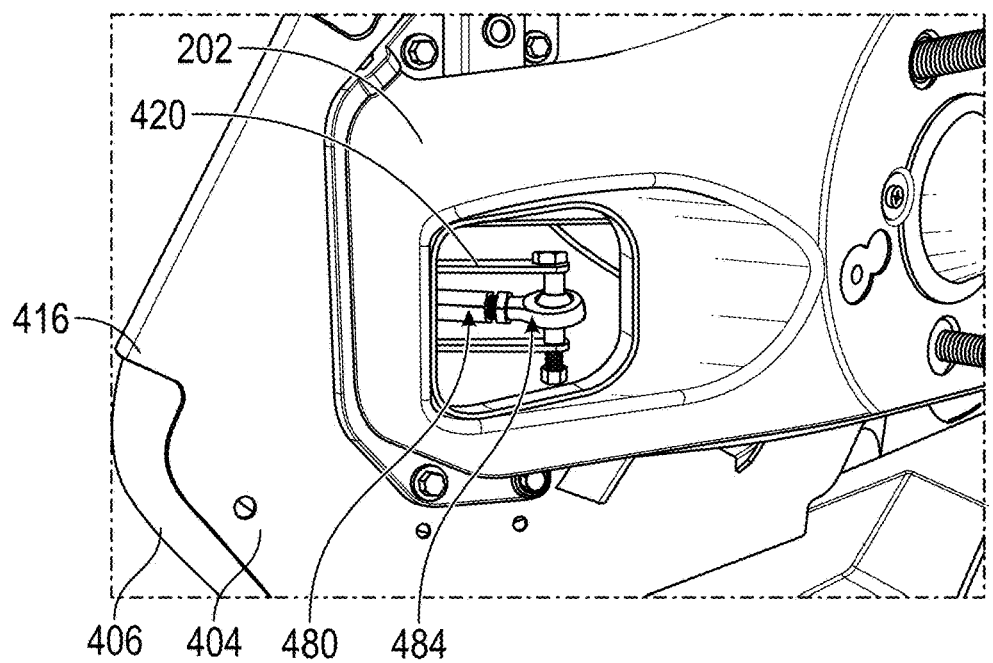
Figure 31:
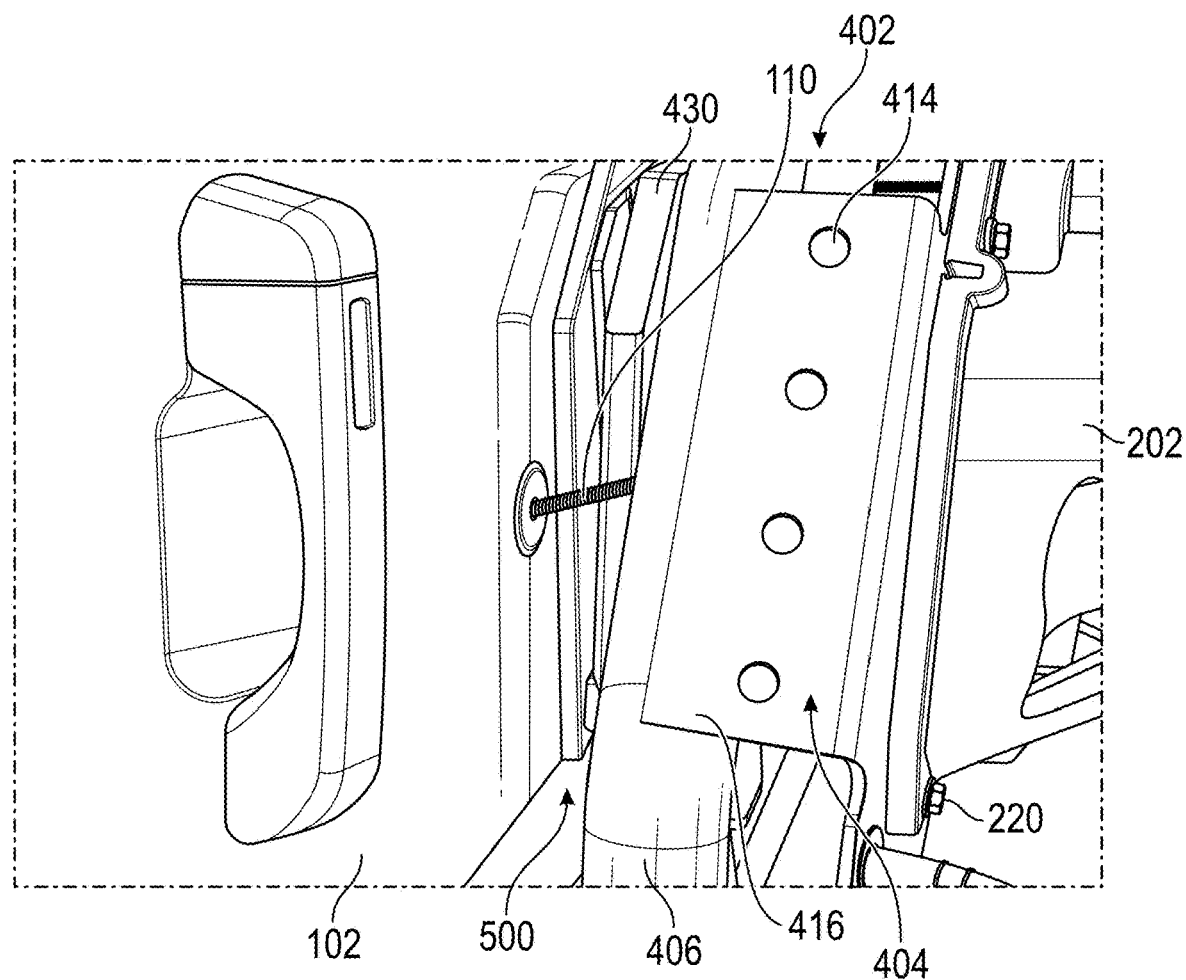
FIGS. 31-32 are detailed views of swing away support assembly attached to the vehicle and illustrate a gap between the rear panel of the vehicle and the main body of the swing away support assembly.
Figure 32:
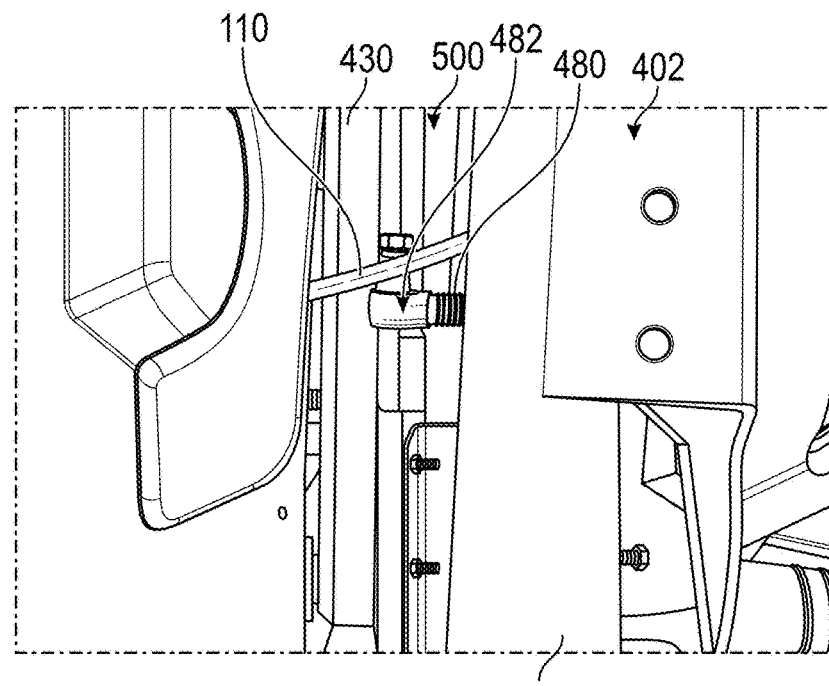
Figure 33:
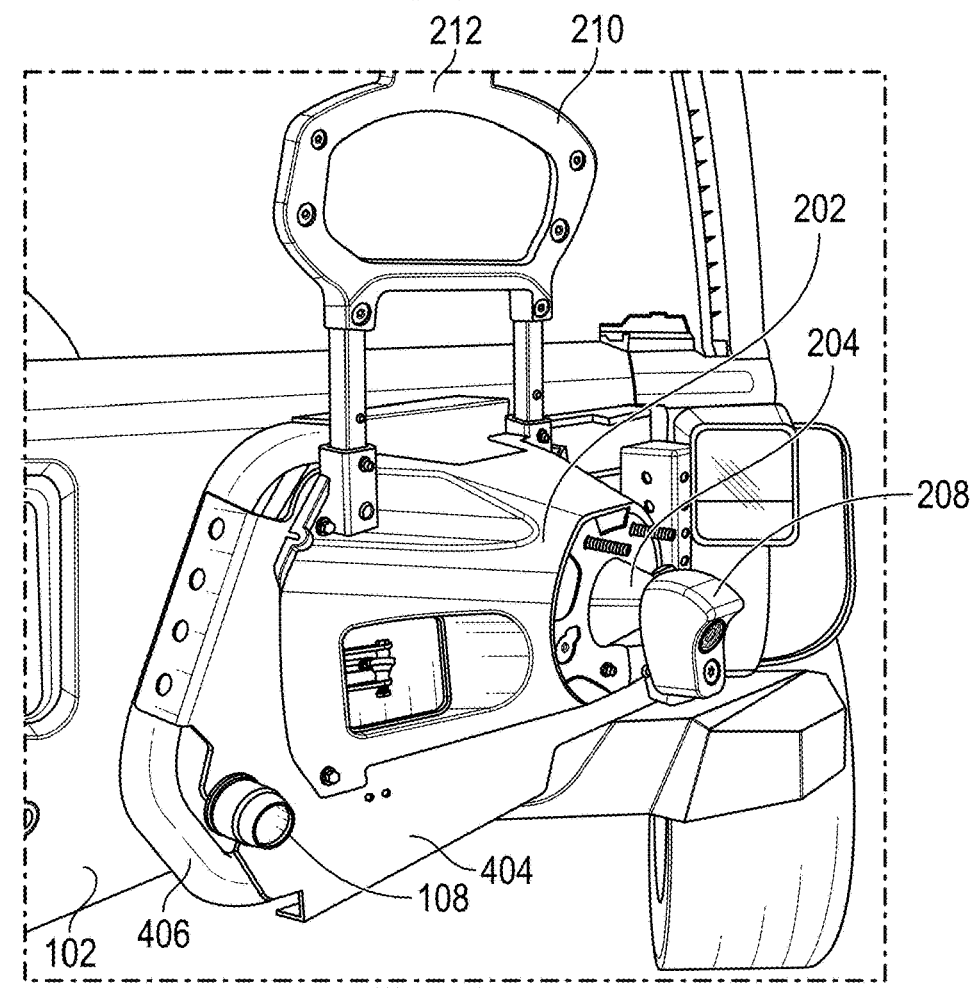
FIG. 33 illustrates the swing away support assembly attached to the rear panel of the vehicle, swinging away from the vehicle together with the rear panel.

As illustrated in FIGS. 29-32, a link 480 can be used to connect the vehicle mount 430 to the main body 402 of the swing away support assembly 400' while maintaining a gap 500 between the vehicle mount 430 and/or the rear panel 102 of the vehicle 100 and the main body 402. The link 480 can have a first end 482 and a second end 484 opposite the first end 482. The link 480 can be about 4-8 inches long. For example, the link 480 can be at least about 5 inches long. Each end 482, 484 of the link 480 can include a rotatable connector 486, such as a rotatable eyelet connector. The first end 482 of the link 480 can couple to a first link mount 440 of the vehicle mount 430 (as shown in FIG. 29) and the second end 484 of the link 480 can couple to a second link mount 420 of the support platform 404 (as shown in FIG. 30). This can advantageously allow the vehicle tailgate and the support assembly 400' to swing together as a single unit (as shown in FIG. 33) when the tailgate is swung open and closed while maintaining the gap 500 between the vehicle mount 430 and/or the rear panel 102 of the vehicle 100 and the main body 402 of the support assembly 400' (as shown in FIG. 32). The size of the gap 500 is adjustable based on the length of the link 480.

Figure 34:
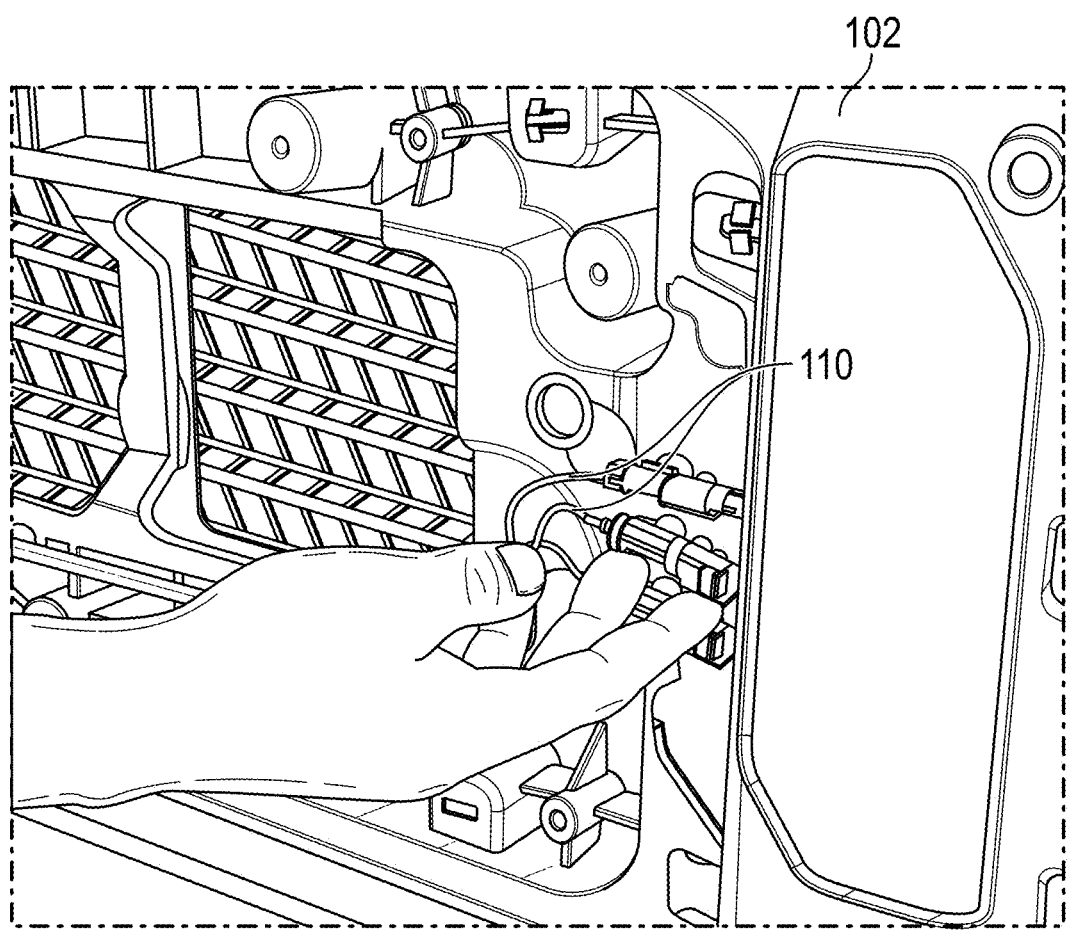
FIG. 34 illustrates a method of reestablishing an electrical connection between the existing spare tire carrier assembly and the vehicle.
Figure 35:
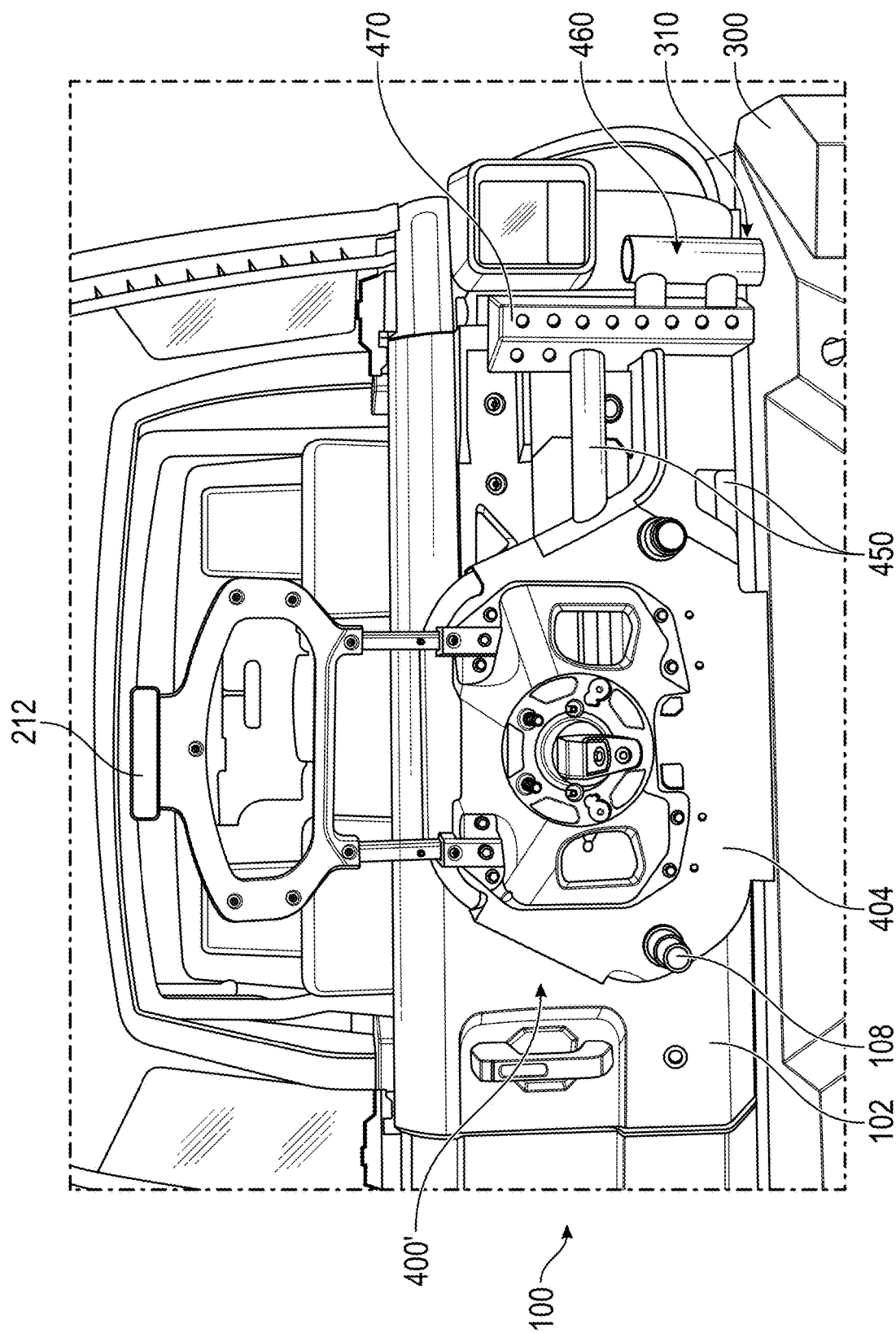
FIG. 35 illustrates the swing away support assembly attached to the rear panel of the vehicle and supporting the existing spare tire carrier assembly.
Figure 36:
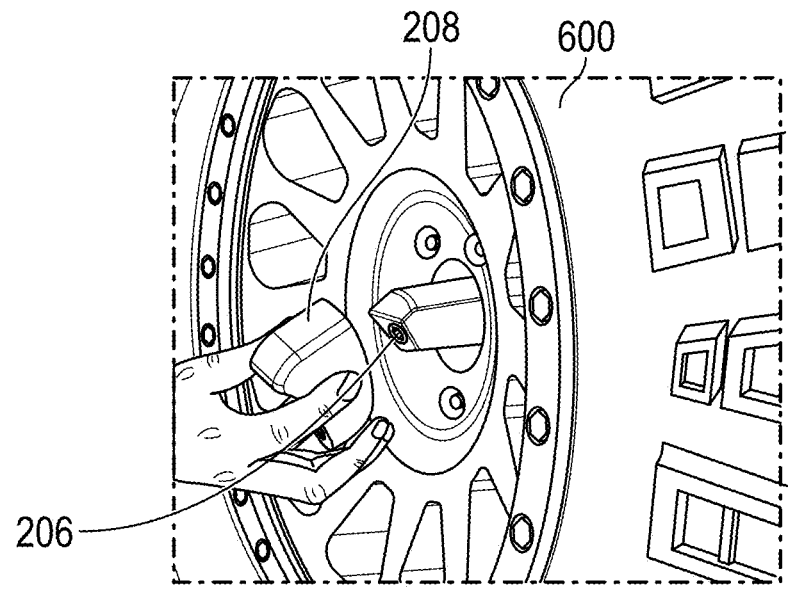
FIGS. 36-37 illustrate a method of attaching a camera cover to a camera housing of the existing spare tire carrier assembly.
Figure 37:
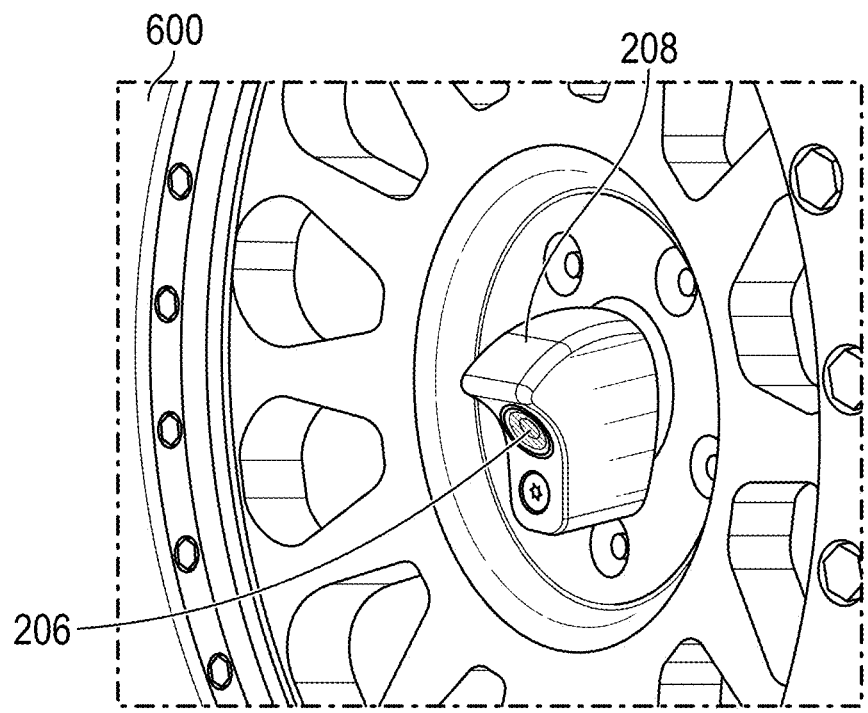

FIGS. 33-34 illustrate a method of reestablishing the electrical connection between the vehicle 100 and the rear camera 206 and/or the rear light 212 in the event that the rear camera 206 and/or the rear light 212 were disconnected from the vehicle 100 during the installation of the swing away support assembly 400'. The inner panel of the tailgate can be removed to provide access to the electrical wiring 110 and the vehicle connectors can be coupled to the corresponding rear camera 206 and/or rear light 212 connectors.

Figure 38:
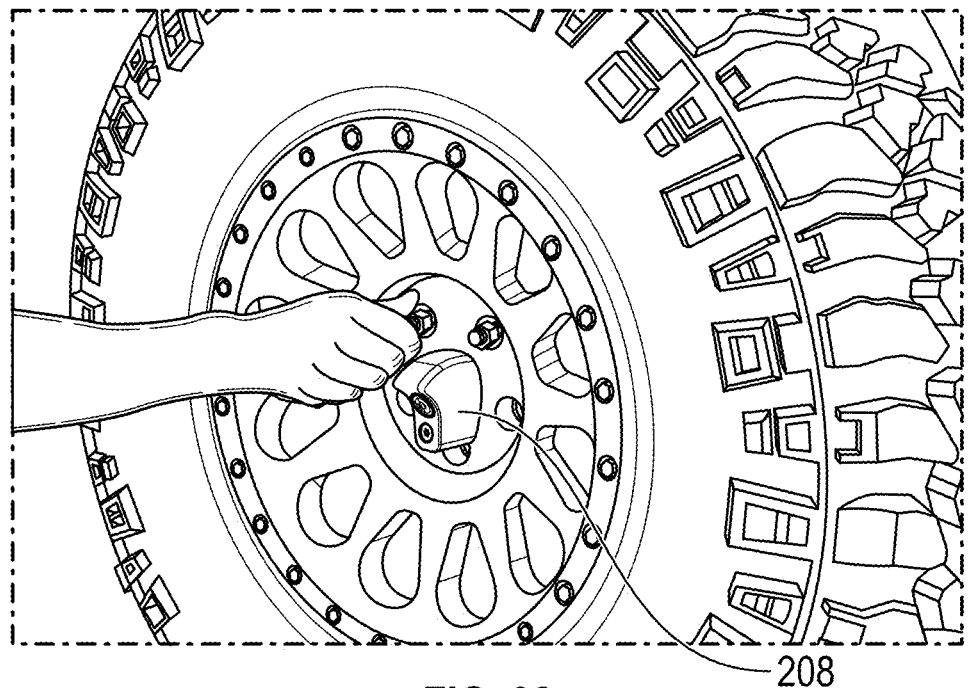
FIG. 38 illustrates a method of securing a tire to the swing away support assembly.
Figure 39:
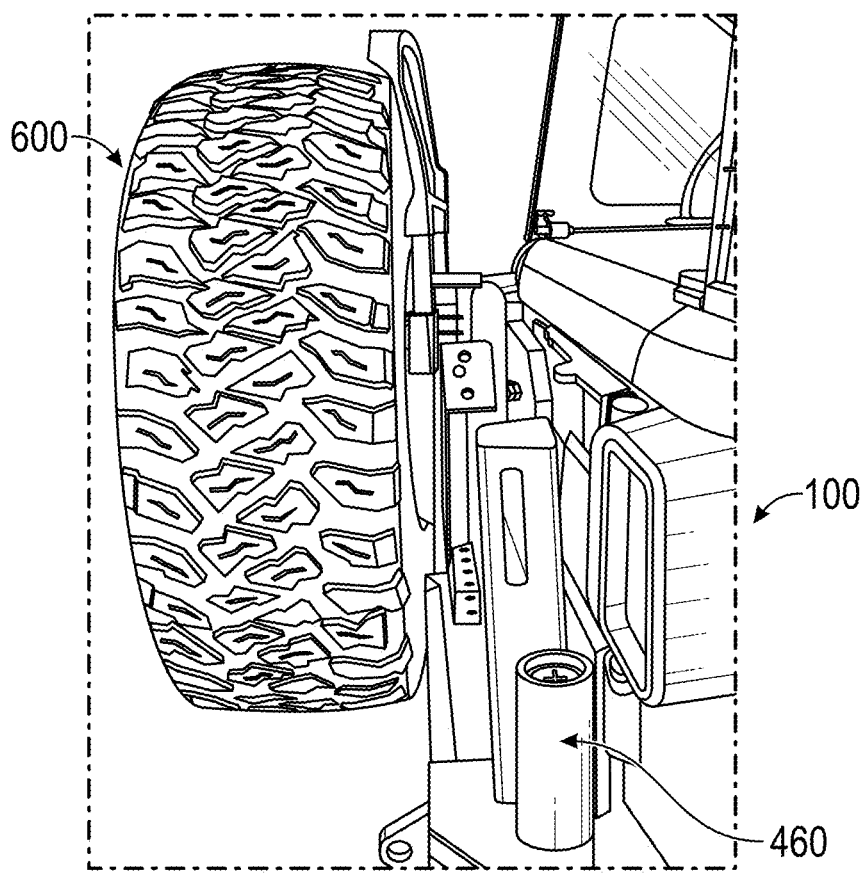
FIG. 39 is a side view of the swing away support assembly attached to the vehicle and supporting the existing spare tire carrier assembly and the tire.

FIGS. 35-39 illustrate a method of securing a tire 600 to the carrier assembly 200 that is mounted on the support assembly 400' attached to the vehicle 100. The camera cover 208 is decoupled from the camera housing 204 before loading the tire 600 on to the carrier assembly 200. The camera cover 208 can be reattached to the camera housing 204 when the tire 600 is mounted on the vehicle 100. The tire 600 is secured in place using fasteners, such as bolts (as shown in FIG. 38).

From the foregoing description, it will be appreciated that inventive swing away support assemblies and installation methods are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A method of mounting a swing away support assembly on a vehicle, the method comprising:
   connecting the swing away support assembly to the vehicle, wherein the swing away support assembly comprises a pivot, an arm, a main body including a support platform, and a vehicle mount, the swing away support assembly being rotatable about the pivot;
   removing an existing spare tire carrier assembly from a rear panel of the vehicle, wherein the existing spare tire carrier assembly comprises a tire carrier housing, a camera housing, a rear camera, a rear light mount, and a rear light; and
   mounting the existing spare tire carrier assembly on to the swing away support assembly in a single step.

2. The method of claim 1, wherein removing the existing spare tire carrier assembly from the rear panel of the vehicle comprises removing the existing spare tire carrier assembly as a single unit.

3. The method of claim 1, wherein removing the existing spare tire carrier assembly from the rear panel of the vehicle comprises keeping the rear light mount connected to the tire carrier housing.

4. The method of claim 1, wherein mounting the existing spare tire carrier assembly on to the swing away support assembly comprises mounting the existing spare tire carrier assembly on to the support platform as a single unit.

5. The method of claim 1, further comprising extending an electrical wire through a hole in the support platform.

6. The method of claim 1, further comprising removing an existing bumper from the vehicle and installing a bumper having a pivot mount on the vehicle.

7. The method of claim 6, wherein connecting the swing away support assembly to the vehicle comprises inserting at least a portion of the pivot of the swing away support assembly into at least a portion of the pivot mount in the bumper, wherein the pivot mount defines an opening in the bumper.

8. The method of claim 1, further comprising creating a hole in an existing bumper for receiving a portion of the pivot of the swing away support assembly.

9. The method of claim 1, further comprising keeping the main body of the swing away support assembly spaced apart from the existing spare tire carrier assembly when connecting the pivot to the vehicle.

10. The method of claim 1, wherein removing the existing spare tire carrier assembly from the rear panel of the vehicle comprises keeping the rear camera connected to a first electrical wire of the vehicle.

11. The method of claim 10, wherein removing the existing spare tire carrier assembly from the rear panel of the vehicle comprises keeping the rear light connected to a second electrical wire of the vehicle.

12. The method of claim 1, wherein removing the existing spare tire carrier assembly from the rear panel of the vehicle comprises separating the rear light mount from the tire carrier housing.

13. The method of claim 1, wherein connecting the swing away support assembly to the vehicle comprises repurposing a plurality of fasteners of the existing tire carrier assembly to secure the vehicle mount to the rear panel of the vehicle.

14. The method of claim 1, further comprising removing a cushion from the rear panel of the vehicle and attaching it to the support platform of the swing away support assembly, the cushion forming a buffer between a tire and the support platform when the tire is attached to the tire carrier housing.

15. The method of claim 1, wherein connecting the swing away support assembly to the vehicle comprises attaching a first end of a link to a first link mount on the vehicle mount and attaching a second end of the link to a second link mount on the support platform such that when the rear panel of the vehicle swings out, the swing away support assembly swings with it and maintains a gap between the vehicle mount and the main body.

16. A swing away support assembly for repositioning an existing spare tire carrier assembly on a vehicle having a bumper, the swing away support assembly comprising:
   a main body comprising a frame and a support platform;
   a pivot configured to connect to the bumper of the vehicle;
   an arm extending from the pivot to the main body;

a vehicle mount configured to attach to a rear panel of the vehicle, wherein the vehicle mount comprises a first link mount and the support platform comprises a second link mount; and a link having a first end and a second end opposite the first end, wherein the first end of the link is coupled to the first link mount of the vehicle mount and the second end of the link is coupled to the second link mount of the support platform.

17. The swing away support assembly of claim 16, wherein the pivot is stepped, having at least a first section with a first diameter and a second section with a second diameter that is larger than the first diameter, and wherein when the pivot is connected to the vehicle the first section of the pivot is inserted into an opening in the bumper.

18. The swing away support assembly of claim 16, wherein the vehicle mount defines an opening for a vehicle vent panel.

19. The swing away support assembly of claim 16, wherein the support platform comprises a back light mount support for a light mount.

20. The swing away support assembly of claim 16, wherein the support platform defines at least two sets of holes that each correspond with a fastener pattern of the existing spare tire carrier assembly such that in use a position of the existing spare tire carrier assembly can be adjusted relative to the support platform to accommodate different sized tires.

21. The swing away support assembly of claim 16, wherein the support platform comprises a plurality of apertures configured to provide clearance.

22. The swing away support assembly of claim 16, further comprising an accessory mount attached to the arm, the accessory mount comprising a support having a plurality of openings.

23. The swing away support assembly of claim 16, wherein each end of the link comprises a rotatable eyelet connector.

* * * * *